US011463762B2

(12) United States Patent
MacKay et al.

(10) Patent No.: US 11,463,762 B2
(45) Date of Patent: Oct. 4, 2022

(54) TIME-SYNCHRONIZED, MULTIZONE MEDIA STREAMING

(71) Applicant: Google LLC, Mountain View, CA (US)

(72) Inventors: Kenneth J. MacKay, Sunnyvale, CA (US); Byungchul Kim, Los Altos, CA (US); Tavis A. Maclellan, Richmond, CA (US); Richard F. Lyon, Los Altos, CA (US); Chet N. Gnegy, Mountain View, CA (US); Pascal T. Getreuer, San Francisco, CA (US); Chien-Jung Kung, San Jose, CA (US); Tomer Shekel, San Francisco, CA (US); Ryan M. Rifkin, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/360,264

(22) Filed: Jun. 28, 2021

(65) Prior Publication Data

US 2021/0329332 A1     Oct. 21, 2021

Related U.S. Application Data

(63) Continuation of application No. 16/812,816, filed on Mar. 9, 2020, now Pat. No. 11,051,066, which is a
(Continued)

(51) Int. Cl.
*H04N 21/43*     (2011.01)
*H04N 21/436*    (2011.01)
(Continued)

(52) U.S. Cl.
CPC ..... *H04N 21/4305* (2013.01); *H04N 21/4302* (2013.01); *H04N 21/43076* (2020.08);
(Continued)

(58) Field of Classification Search
CPC ......... H04N 21/4305; H04N 21/43076; H04N 21/4302; H04N 21/43615; H04N 21/44227; H04N 21/64
See application file for complete search history.

(56) References Cited

U.S. PATENT DOCUMENTS

2006/0013208 A1  1/2006  Rietschel et al.
2006/0149850 A1  7/2006  Bowman
(Continued)

FOREIGN PATENT DOCUMENTS

CN       103327377     9/2013
CN       104052562     9/2014
WO    WO 2015038186    3/2015

OTHER PUBLICATIONS

Examination Report dated Jan. 14, 2020 in EP Patent Application No. 16775950.5.
(Continued)

*Primary Examiner* — Mishawn N. Hunter
(74) *Attorney, Agent, or Firm* — Byrne Poh LLP

(57) ABSTRACT

In a general aspect, a system for media playback can include a first media playback device configured to receive a media stream from a media casting device over a data network, the first media playback device being a member of the media playback group and a second media playback device configured to receive the media stream, the second media playback device being a member of the media playback group. The first media playback device and the second media playback device can be collectively configured to designate one of the first media playback device and the second media playback device as a leader playback device of the media playback group. The playback device not designated as the leader playback device can be designated as a follower playback device of the media playback group. The first media playback device and the second media
(Continued)

playback device can be further collectively configured to determine a clock offset between the leader playback device and the follower playback device. The leader playback device can be configured to receive a broadcast of the media stream over the data network; play the media stream; and provide the media stream to the follower playback device. The follower playback device can be configured to play the media stream in synchronization with the leader playback device based on the clock offset.

19 Claims, 7 Drawing Sheets

Related U.S. Application Data continuation of application No. 16/450,323, filed on Jun. 24, 2019, now Pat. No. 10,587,908, which is a continuation of application No. 15/762,903, filed as application No. PCT/US2016/053350 on Sep. 23, 2016, now Pat. No. 10,334,306.

(60) Provisional application No. 62/233,972, filed on Sep. 28, 2015.

(51) Int. Cl.
  *H04N 21/442* (2011.01)
  *H04N 21/64* (2011.01)

(52) U.S. Cl.
  CPC . *H04N 21/43615* (2013.01); *H04N 21/44227* (2013.01); *H04N 21/64* (2013.01)

(56) References Cited

U.S. PATENT DOCUMENTS

| | | |
|---|---|---|
| 2007/0038999 A1 | 2/2007 | Millington |
| 2008/0089268 A1 | 4/2008 | Kinder et al. |
| 2009/0264114 A1 | 10/2009 | Virolainen et al. |
| 2010/0318860 A1 | 12/2010 | Ohbi |
| 2013/0234913 A1 | 9/2013 | Thangadorai et al. |
| 2013/0251329 A1 | 9/2013 | McCoy et al. |
| 2014/0181270 A1 | 6/2014 | Millington |
| 2014/0323036 A1 | 10/2014 | Daley et al. |
| 2015/0100143 A1 | 4/2015 | Gao et al. |
| 2016/0191584 A1 | 6/2016 | Dickow et al. |

OTHER PUBLICATIONS

Examination Report dated Apr. 1, 2019 in EP Patent Application No. 16775950.5.
Examination Report dated Aug. 6, 2020 in EP Patent Application No. 16775950.5.
International Search Report and Written Opinion dated Nov. 10, 2016 in International Application No. PCT/US2016/053350.
Montagud, M. et al., "Inter-Destination Multimedia Synchronization: Schemes, Use Cases and Standardization", in Multimedia Systems, vol. 18, No. 6, Jul. 2012, pp. 459-482.
Notice of Allowance dated Feb. 7, 2019 in U.S. Appl. No. 15/762,903.
Notice of Allowance dated Feb. 22, 2021 in U.S. Appl. No. 16/812,816.
Notice of Allowance dated Oct. 31, 2019 in U.S. Appl. No. 16/450,323.
Office Action dated May 8, 2020 in CN Patent Application No. 201680034765.4.
Office Action dated Jul. 25, 2019 in U.S. Appl. No. 16/450,323.
Office Action dated Sep. 4, 2019 in CN Patent Application No. 201680034765.4.
Office Action dated Oct. 5, 2018 in U.S. Appl. No. 15/762,903.
Office Action dated Oct. 16, 2020 in U.S. Appl. No. 16/812,816.
Examination Report dated Jul. 14, 2021 in EP Patent Application No. 16775950.5.

TIME-SYNCHRONIZED, MULTIZONE MEDIA STREAMING

CROSS-REFERENCE TO RELATED APPLICATIONS

This application is a continuation of U.S. patent application Ser. No. 16/812,816, filed Mar. 9, 2020, which is a continuation of U.S. patent application Ser. No. 16/450,323, filed Jun. 24, 2019, which is a continuation of U.S. patent application Ser. No. 15/762,903, filed Mar. 23, 2018, which is a national stage application under 35 U.S.C. § 371 of International Patent Application No. PCT/US2016/053350, filed Sep. 23, 2016, which claims the benefit of U.S. Provisional Patent Application No. 62/233,972, filed Sep. 28, 2015, each of which is hereby incorporated by reference herein it its entirety.

TECHNICAL FIELD

This disclosure relates to media streaming. More specifically, this disclosure relates to time-synchronized media streaming on multiple devices (e.g., multizone media streaming).

SUMMARY

In a general aspect, a system for media playback can include a media casting device configured to broadcast a media stream to a data network for playback by a media playback group; a first media playback device configured to receive the media stream, the first media playback device being a member of the media playback group; and a second media playback device configured to receive the media stream, the second media playback device being a member of the media playback group. The first media playback device and the second media playback device can be collectively configured to designate one of the first media playback device and the second media playback device as a leader playback device of the media playback group. The one of the first media playback device and the second media playback device not designated as the leader playback device can be designated as a follower playback device of the media playback group. The first media playback device and the second media playback device can be further collectively configured to determine a clock offset between the leader playback device and the follower playback device. The leader playback device can be configured to receive the broadcast of the media stream from the data network; play the media stream; and provide the media stream to the follower playback device. The follower playback device can be configured to play the media stream in synchronization with the leader playback device based on the clock offset.

Implementations can include one or more of the following features. For instance, the first media playback device and the second media playback device can each include a respective record indicating membership in the media playback group. The media playback group can be a first media playback group, and the respective record of the first media playback device can further indicate membership in a second media playback group.

The system can include a third media playback device configured to receive the media stream. The third media playback device can be a member of the media playback group. The third media playback device and the leader playback device can be collectively configured to determine a clock offset between the leader playback device and the third playback device. The leader playback device can be configured to provide the media stream to the third media playback device. The third media playback device can be configured to play the media stream in synchronization with the leader playback device based on the clock offset between the leader playback device and the third playback device.

Designating one of the first media playback device and the second media playback device as a leader playback device of the media playback group can include comparing a measure of quality of a data connection of the first media playback device with the data network and a measure of quality of a data connection of the second media playback device with the data network.

Each of the first media playback device and the second media playback device can be configured to implement a broadcast service to broadcast a message indicating membership in the media playback group. The broadcasted message can include a query requesting a response from media playback devices that are connected to the data network and members of the media playback group.

The leader playback device providing the media stream to the follower playback device can include providing the media stream to the follower playback device in a sequence of timestamped data packets.

Playing, by the follower playback device, the media stream in synchronization with the leader playback device based on the clock offset can include playing, by the follower playback device, the media stream in synchronization with the leader playback device based on the clock offset and an output delay of the follower playback device. The clock offset can be determined based on a round-trip-time (RTT) between the leader playback device and the follower playback device.

In another general aspect, a method can include connecting a first media playback device with a data network, the first media playback device being operationally associated with a media playback group and connecting a second media playback device with the data network, the second media playback device being operationally associated with the media playback group. The method can further include designating one of the first media playback device and the second media playback device as a leader playback device of the media playback group, where the one of the first media playback device and the second media playback device not designated as the leader playback device can be designated as a follower playback device of the media playback group. The method can also include determining a clock offset between the leader playback device and the follower playback device; receiving, at the leader playback device, a media stream for playback by the media playback group and playing the media stream by the leader playback device. The method can still further include providing, by the leader playback device, the media stream to the follower playback device and playing, by the follower playback device, the media stream in synchronization with the leader playback device based on the clock offset.

Implementations can include one or more of the following features. For instance, connecting the first media playback device with the data network can include the first media playback device sending a broadcast message indicating the first media playback device's membership in the media playback group. The broadcast message can include a query requesting a response from media playback devices that are connected to the data network and operationally associated with the media playback group. The media playback group can be a first media playback group and the broadcast message can indicate the first media playback device's membership in a second media playback group. Connecting the second media playback device with the data network can include the second media playback device sending a broadcast message indicating the second media playback device's membership in the media playback group.

Designating one of the first media playback device and the second media playback device as the leader playback device can include determining a leadership metric for the first media playback device; determining a leadership metric for the second media playback device; and designating one of the first media playback device and the second media playback device as the leader playback device based on a comparison of the leadership metric for the first media playback device and the leadership metric for the second media playback device. The leadership metric for the first media playback device can be based on one or more attributes of a network connection of the first media playback with the data network. The leadership metric for the second media playback device can be based on one or more attributes of a network connection of the second media playback with the data network.

Determining the clock offset between the leader playback device and the follower playback device can include, iteratively: sending, by the follower playback device, a synchronization request including a timestamped packet to the leader playback device, the timestamped packet indicating a time of a clock of the follower playback device; receiving, by the leader playback device, the synchronization request from the follower playback device; sending, by the leader playback device in response to the synchronization request, a synchronization response including an indication a time of a clock of the leader playback device and the time of the clock of the follower playback device included in the synchronization request; and determining, by the follower device based on the synchronization response: a round-trip-time (RTT) of the synchronization request and synchronization response; and the clock offset based on the RTT. Determining the RTT can include calculating at least one of a weighted moving average and a linear regression based on two or more synchronization responses.

Providing the media stream to the follower playback device can include providing the media stream to the follower playback device in a sequence of timestamped data packets. The method can include buffering, by the leader playback device and the follower playback device, respective portions of the media stream.

The follower playback device can be a first follower playback device, and the method can include connecting a third media playback device with the data network. The third media playback device can be operationally associated with the media playback group. The method can include designating the third media playback device as a second follower playback device and determining a clock offset between the leader playback device and the second follower playback device. The method can include providing, by the leader playback device, the media stream to the second follower playback device and, playing by the second follower playback device, the media stream in synchronization with the leader playback device based on the clock offset between the leader playback device and the second follower playback device.

The method can include sending, by the follower playback device to the leader playback device, an indication that the follower playback device is leaving the media playback group. In response to the indication, the method can include discontinuing, by the leader playback device, providing the media stream to the follower device and updating, by the leader playback device, membership information for the media playback group to remove the follower playback device.

Playing, by the follower playback device, the media stream in synchronization with the leader playback device based on the clock offset can include playing, by the follower playback device, the media stream in synchronization with the leader playback device based on the clock offset and an output delay of the follower playback device.

The media stream can be a first media stream, and the method can include receiving, at the leader playback device, a request to playback a second media stream by the media playback group. In response to the request to playback the second media stream, the method can include stopping playback of the first media stream by the leader playback device and the follower playback device. After stopping playback of the first media stream, the method can include playing the second media stream by the leader playback device; providing, by the leader playback device, the second media stream to the follower playback device; and playing, by the follower playback device, the second media stream in synchronization with the leader playback device based on the clock offset.

BRIEF DESCRIPTION OF THE DRAWINGS

Like reference symbols in the various drawings indicate like elements. Reference numbers for some like elements may not be repeated for all such elements.

DETAILED DESCRIPTION

This disclosure is directed to systems and methods for media (e.g., audio streaming), where playback is time-synchronized across multiple playback devices (e.g. multizone playback). While the approaches described herein are generally discussed with respect to streaming (playback) of audio content, it will be appreciated that the approaches described herein may also be used for playback of other types of media, such as video, photographs, etc.

When playing media from a common source (e.g., a media source device) on a multiple playback devices over a data network, variation in respective network connection quality for the multiple playback devices can result in playback time delays between the multiple playback devices. Such playback time delays can negatively impact a user's experience. Using the approaches described herein, media can be played back by a media playback group that includes a leader playback device (leader device) and one or more follower playback devices (follower devices). In such implementations, the leader device, using the approaches described herein, can be respectively time-synchronized (e.g., determine a respective clock offset and/or respective clock drift) with each of the follower devices to account for variations in network connection for respective playback devices (leader device and/or follower devices). The leader device can receive (e.g., from a media source device) a media stream for playback by the leader device and the follower devices (the media playback group). The leader device can then play the received media stream and also provide the received media stream to its associated follower devices. The follower device can play the media stream, received from the leader device, based on their respective time-synchronization with the leader device.

Figure 1:
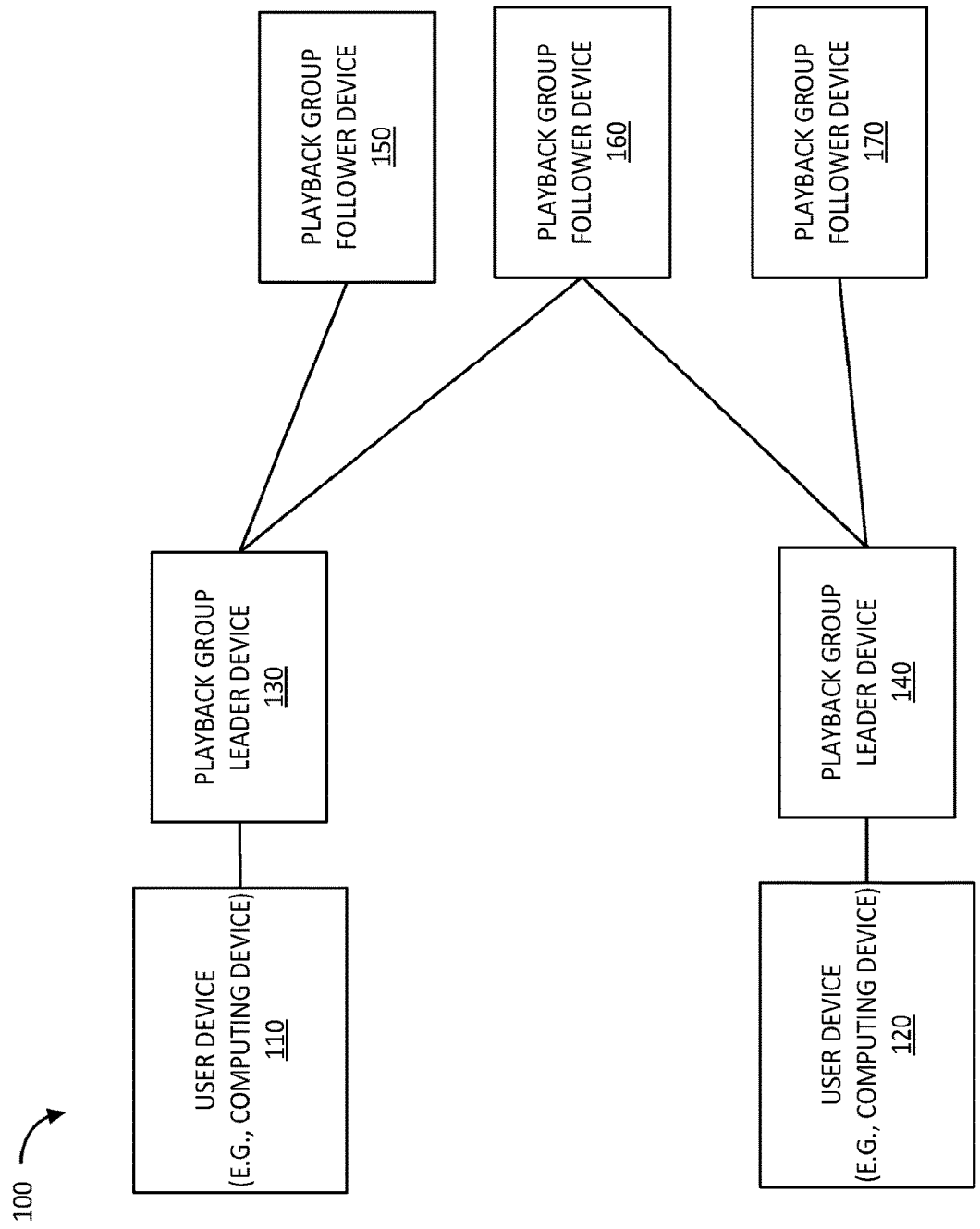
FIG. 1 is a block diagram illustrating a system for multizone media streaming.

FIG. 1 is a block diagram illustrating a system 100 that can be used for multizone, time-synchronized media streaming (media playback), according to an implementation. The system 100 is shown by way of example and for purposes of illustration. In other embodiments, multizone media streaming systems can have a number of other configurations.

As illustrated in FIG. 1, the system 100 includes a first user device 110 (e.g., which can be used to start and stop media casting (broadcasting) and/or provide media for streaming) and a second user device 120. The user devices 110 and 120 can take a number of forms, such as a smartphone, a laptop computer, a netbook computer, a media player device, a television, etc. For instance, in the system 100 of FIG. 1, the user devices 110 and 120 can be computing devices with data network communication capabilities.

The system 100 of FIG. 1 also includes a first playback group leader device 130 and a second playback group leader device 140. The leader devices 130 and 140 may be devices capable of playing streaming media (e.g., media received from the user devices 110 and 120 and/or media on a data network, such as the Internet, which the leader playback devices 130, 140 can obtain for media casting purposes) and also have data network communication capabilities (e.g., for obtaining and/or communicating media data and control data) with other playback devices of the multizone media streaming system 100, such as described herein.

The system 100, as shown in FIG. 1, also includes a first playback group follower device 150, a second playback group follower device 160 and a third playback group follower device 170. The leader devices 130 and 140 may be devices capable of playing streaming media (e.g., media received from the user devices 110 and 120, media received from the Internet, etc.) and also have data network communication capabilities (e.g., for communication with the other devices of the multizone media streaming system 100). Media received at a leader device (130, 140) can then be time-synchronized and played back (cast, streamed, etc.) by the leader device and corresponding follower devices (150, 160, 170) using the approaches described herein. In some implementations, a given playback device can be a leader device and/or a follower device in multiple playback groups.

As shown in FIG. 1, the follower device 150 and the follower device 160 are operationally coupled with the leader device 130 in a first multizone media streaming group. Similarly, the follower device 160 and the follower device 170 are operationally coupled with the leader device 140 in a second multizone media streaming group. In the system 100, the follower device 160 is a member of (operationally associated with) both the first multizone media streaming group and the second multizone media streaming group. In other implementations, other arrangements are possible, for instance, the system could include additional or fewer media source devices, have additional or fewer playback groups, have playback groups with single devices, and so forth.

In the system 100, the determinations as to which of the playback group devices 130-170 are leader devices and which devices are follower devices for a given playback group can be determined dynamically, such as using the approaches described herein. Using such approaches, though not shown in FIG. 1, a playback device that is a follower device in one playback group may be a leader device in another playback group, and vice versa. Devices within a playback group can operate in conjunction with each other to play a media stream (e.g., a digital audio stream or the like) using time-synchronization (e.g., such as in accordance with the approaches described herein) to synchronously playback the media stream on the each of the playback (e.g., leader device and follower devices) of a given playback group.

In an implementation, configuration of a playback group, such as discussed herein, can be done on a per device (playback device) basis. For example, a given playback device (e.g., in the system 100) can keep track of which playback groups (groups) it is a member of without relying on a centralized, canonical source that maintains group membership information. In such implementations, playback devices may only be added to and/or removed from a group when they are online.

Figure 2:
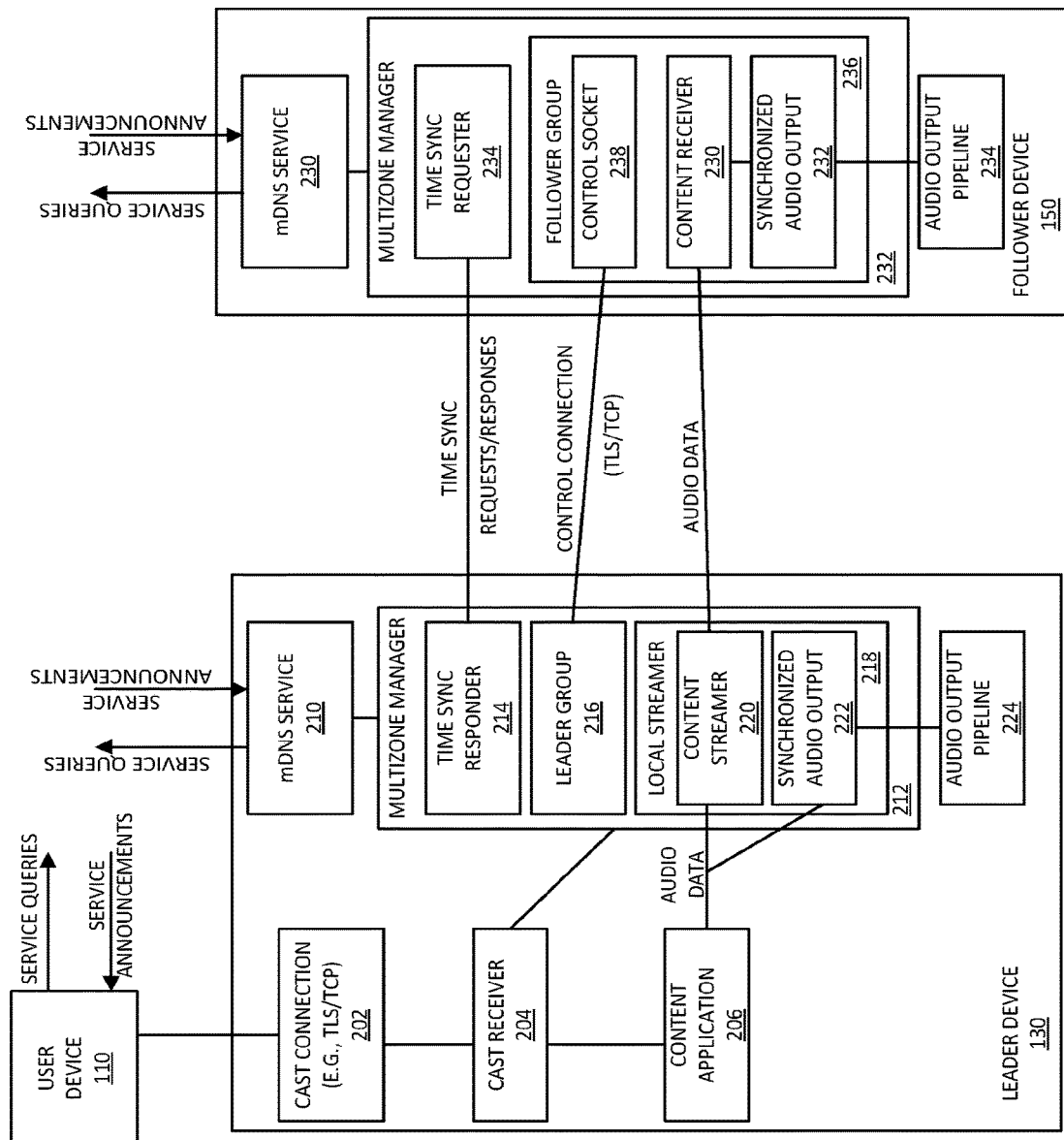
FIG. 2 is a diagram illustrating components of the system of FIG. 1 and communication between those components.

In such approaches, when a playback device comes online (or is added to a group), it can announce its group membership using a multicast Doman Name System (mDNS) broadcast message (or other appropriate mechanism), such as is shown in FIG. 2. Based on such messages, other online playback devices (that are already online) in the system 100, or other multizone media streaming system, can dynamically determine the group membership of all devices as they come online. The newly online playback device also can also send an mDNS request (or other appropriate protocol request) for the group membership information of existing online devices. Based on responses to this request, the newly online device can build group membership information of all other online devices. Similarly, when a playback device is removed from (leaves) a group and/or joins another group, it can announce its new group configuration so that other online devices can update their group membership knowledge for the announcing device.

When a group is disbanded (e.g., the group is removed from available playback groups) a disband notification can be sent to devices in that playback group. However, some devices that are members of the disbanded group may not be online to receive a corresponding disband notification. In such instances, in order to avoid a disbanded group showing up again (e.g., in a list of available playback groups displayed to a user on a media source device, e.g., user devices 110, 120) when those group members that were offline at the time of the disband notification come online, the group disband notification can be persistently stored in all local, online devices (e.g., until all group members are notified). When a previously offline device of the disbanded group next comes online and announces its membership in a disbanded group, the other online devices can then send the previously offline device the previous disband notification. In some instances, a newly online device may not realize that a group it was a member of has been disbanded (e.g., no members of the disbanded group are online when it announces its membership in the disbanded group). In such instances, the group can just be disbanded again (e.g., by a user from a media source device, such as user devices 110, 120).

In certain implementations, each playback group of the system 100, for example, can be identified by a universally unique identifier (UUID), which can be randomly generated at the time a given playback group is created. Such UUIDs can be used to determine group membership, and also to identify groups which have been disbanded. In certain implementations, a user can create two logically different groups (different UUIDs) with the same (e.g., text label) name and/or a playback group can have multiple devices that have the same (e.g., text label) name.

In other implementations, cloud-based storage (e.g., local cloud storage, Internet cloud storage, etc.) can be used for maintaining group membership information. Such implementations would allow for the ability to display group members that are offline, and the ability to remove an offline device from a group, as playback group information is maintained separately from the devices of a given playback group. In such an approach, on startup, a device that was removed from a group while it was offline can, as part of an initialization process when it comes online, synchronize with membership information in the cloud-based storage for each group that it is (thinks that it is) a member of (e.g., keyed by the groups' UUIDs) to determine if it has been removed from the group (or if the group has been disbanded). Similarly, playback devices (e.g., leader devices 130, 140 and follower devices 160, 170, 180) could use such cloud-based membership information to determine full group membership for each group they are a member of (think they are a member of).

As briefly noted above, a playback group configuration process can include each playback device that is a member of at least one group (e.g., of a local media playback and/or media casting system) transmitting (broadcasting) a "service announcement" (e.g., an mDNS) message to other online playback devices, such as illustrated in FIG. 2. In an example implementation, such a message can be a text (TXT) record, where the first entry in the TXT record can be the device ID (e.g., in the format "id=<device ID>"). Additional entries in the TXT record can list all the groups that the given playback device is a member of. For example, a corresponding entry for each playback group that a device is a member of can contain a group name and an UUID; an indication whether the given device thinks it is currently the leader of the given playback group; an indication whether the given playback group is currently casting (playing) media (e.g., in the TXT record of the playback group leader device).

In some implementations the entries can be DNS-based Service Discovery (DNS-SD) TXT records that conform with the requirements of RFC 6763 section 6. For example, the group list can be a list of <length><key>=<value> entries, one entry per group. The <key> can be the group UUID encoded as lowercase hexadecimal; the <value> can be encoded as <flags>|<group name>, where <flags> contain bit flags about the current group state, encoded as a base-10 integer. Such flags can be as follows, though other flags are possible. For instance, a flag with a value of 0x01 can indicate that a corresponding playback device is (believes it is) the current group leader of a given playback group. A flag with a value of 0x02 can indicate that the corresponding playback group is currently playing media that is being casted. A flag with a value of 0x04 can indicate that the corresponding device has been explicitly configured as the playback group leader. In other implementations, other flags and/or other flag values can be used.

A service (SRV) record, which can be included in DNS information for the devices of the system 100, can contain a "leadership metric" in priority and weight fields (e.g., as a 32-bit metric) of the record. The SRV record can also contain a host IP address and a port ID of the advertised service. The leadership metrics (of all members of a group) can be used by each group member to determine which device should be the playback group leader for a given playback group (e.g., the device with the largest leadership metric can be selected (identified) as the leader). In an implementation, the leadership metric for a given playback device can be determined as follows.

If a playback device (e.g., one of the follower devices 150, 160, 170) does not have the ability to be a playback group leader, such as due to limited CPU/memory, it can return a 0 as its leadership metric. For devices with the ability to function as a playback group leader, a leadership metric can be determined as a measure of network quality for a given playback device. In an implementation, this measure can be calculated as follows. If the given playback device is connected to a corresponding playback system (playback group) via an Ethernet connection, the measure of network quality can be set to 100*65536. Otherwise, the measure of network quality can be set to 10*65536+the given playback device's (measured) WiFi signal-to-noise ratio (SNR) in dBm. If the WiFi network is 5 GHz, the SNR value used in the determination of the network quality measure can be given, for example a "boost" (e.g., a value added to the measured SNR for the given playback device) to determine an effective SNR value that can be used to determine a leader device for a given playback group (by comparison with effective SNR values of other playback devices of the playback group). If a playback device is "always on", its quality measure can be multiplied by an implementation dependent (scaling, weighting, etc.) constant.

In certain implementations, other approaches for determining a leadership metric (quality measure) can be used. For instance, an additional boost to the effective SNR value used to determine a leadership metric can be added for playback devices connected to a playback group via 5 GHz WiFi if their measured SNR exceeds an SNR threshold value (e.g., a 25 dBm threshold in an example implementation). For instance, this additional effective SNR boost can be determined as 3*(measured or effective SNR−SNR threshold), where the multiplier value of (3 in the example) can vary based on the specific implementation. Further, in certain implementations, for playback devices connected via WiFi at any frequency, another additional fixed boost value (e.g., 6 dBm) can be given to (added to, etc.) the effective SNR value (e.g., the measured SNR plus any previously added boost values) that is used to determine a leadership metric for a playback device that is currently designated as a playback group leader, which can reduce the frequency of the playback group leader role being swapped between devices of an associated playback group due to fluctuations in respective SNRs of the playback devices (e.g., measured/actual SNRs).

Using the above approaches, an effective SNR (effective_SNR) value for use in calculating leadership metrics for a playback device that is connected to a playback group via a WiFi connection can be calculated (determined) using the following sequence. Initially, an effective_SNR value for a given playback device can be set as being equal to the measured (actual) SNR of that device. If the WiFi connection frequency is 5 GHz, a 5 GHz boost value (e.g., 8 dBm, 10 dBm, etc.) can be added to the previous effective_SNR value (e.g., the actual SNR in this example). Further, if the WiFi connection frequency for the given playback device is 5 GHz and the measured SNR is above the SNR threshold value, an additional boost value proportional to the measured SNR (such as discussed above) can be added to the previously determined effective_SNR value. Still further, if the given playback device is currently designated as the leader device of an associated playback group, another additional boost the effective_SNR value can be made (e.g., 6 dBm, such as discussed above).

Using the approaches described herein, playback group members, e.g., in the system 100, can discover each other as they come online, and keep track of other group members using casting service queries and casting service announcements (e.g., mDNS messages), such as shown in FIG. 2. For instance, when a (playback) device of the system 100 comes online or when its group membership changes, it can announce such events and/or changes. The playback device coming online can also query all other local playback devices. After a timeout period (e.g., 1 second), the playback device coming online can determine the group leader for each playback group that it is a member of. For example, the leader device of a playback group can be determined using the approach discussed below.

If there is only one playback device in the playback group (e.g., one device that is active, online, etc.), that device is designated as the playback group leader. If the playback group is currently casting (streaming) media, the playback device that is designated as the playback group leader remains the leader until the media casting ends. Otherwise, the playback device with the highest leadership metric (e.g., effective_SNR value) is made the playback group leader. If multiple devices have the same leadership metric, a leader device can be determined by comparing IP addresses of those multiple devices. In one implementation, the playback device with the lowest IP address can be selected as the leader. In another implementation, the playback device with the highest IP address can be selected as the leader. In other implementations, other approaches (e.g., using other parameters) can be used to determine a leader from playback devices with equal leadership metric values.

Once a given playback device determines a group leader (assuming it is not the leader) for a playback group it is a member of, the playback (follower) device can set up a reliable data transport connection, e.g., a TCP connection, with the leader device, where the data transport connection can then be used to authenticate the follower device and set up encryption keys. In an example implementation, a TCP connection timeout can be 15 seconds. If a given TCP connection times out for a follower device, the associated leader device can be assumed to be offline (e.g., dead), and the follower device (e.g., in cooperation with other devices in playback group of the system 100) can determine a new leader (e.g., starting by re-querying playback devices in the associated playback group). To determine if the leader device is active, the given follower device can, alternatively, start sending clock synchronization (sync) requests to the leader device. Each follower device in a playback group can send such clock sync requests to the leader device at least once every 5 seconds. If a follower device does not receive any clock sync responses (from an indicated leader device) within 20 seconds, it can assume that the indicated leader device has been lost (e.g., has gone offline, was unplugged, disconnected, etc.) and a new leader for the associated playback group can be determined (e.g., starting by re-querying). Whenever the playback group leader device changes, associated follower devices should establish contact (e.g., TCP and time sync) with the new leader device.

In an implementation, if a playback device thinks it should become the new group leader of a given playback group, that playback device can go into a probing state, placing its SRV and TXT records (as discussed above) into an authority section of a corresponding probe query. Upon receiving this query, the current leader (if any) checks to see if the probing device should actually be the leader (e.g., based on leadership metrics). If the current leader determines it should be replaced, it should immediately send goodbye packets for its leader service and deregister as the group leader. The probing device can finish probing (e.g., in approximately 1 second, or less) after the deregistration of the previous leader device and become the new leader. In such approaches, there can be a short time window (e.g., approximately 1 second, or less) where there is no leader for a given playback group.

In certain implementations, the leader of a playback group cannot be changed during a group cast (e.g., multizone media cast). In such implementations, if the group leader goes offline, the cast stops. Similarly, if a user casts, e.g., from user device 110 or user device 120, a different media stream (different than a media stream that is currently being casted) directly to a currently casting group's leader device (or another group containing the leader), the first (current) group cast can stop. In such approaches, for purposes of user experience consistency, if a user casts to any member of a currently casting group (or another group that overlaps the currently casting group), the current group cast may stop and the new cast can then play on the target playback device/ playback group. However, in comparison, in such implementations, if playback group members (follower devices) of a currently casting group go offline and/or become unavailable for some other reason, the group cast may not stop, which will avoid a playback group media cast from repeatedly stopping and starting if one (or more) playback group follower member (e.g., due to a bad network connection and/or other issue) repeatedly cycles between being online and offline.

In order to support compatibility between different media players and/or media casting applications when performing a group media cast, as compared to casting to a single device, a playback group leader (if any) can announce itself as a playback service with an associated group name, but pointing at (designating) a different port (for the group playback service) from its normal default media casting port so that launch requests for the playback group can be differentiated from launch requests for that specific device (e.g., as a single casting device that is not part of a playback group). In such approaches, the casting group may then operate as a virtual device. Note that, in some implementations, a playback device may not announce a group cast service if there is only one online group member.

However, in certain implementations, every media casting session (e.g., every media casting session requested by the user device 110 or the user device 120 in the system 100 of FIG. 1) can be configured to operate as a group cast (even for cast requests that are initially made to a single playback device, rather than to a predefined casting group). Such an approach (which can be referred to as implementing on-demand groups, or groups-on-demand) can be implemented by having all media casting sessions that are initially sent to a single playback device be set up using the approaches described herein for multiple playback device casting groups (e.g., using a multizone media casting backend for media output). In such implementations, follower devices can be easily added to/removed from an associated casting session at any time during the cast, such as using the techniques described herein.

Once a group-on-demand casting session is created, it can behave in the same way as a predefined group casting session. For instance, pause, resume, and other functions can be configured to work from any device in a group-on-demand. Further, playback group volume functions (e.g., group volume and individual device volume), such as described herein, can be configured to operate in like manner for a group-on-demand as for a predefined playback group. Implementing such groups-on-demand can include each playback device including (defining) a "virtual group" membership entry (e.g., in a respective TXT record), where the virtual group membership for a given playback device is defined to only contain that playback device. In such approaches, associated media casting systems, such as the system 100, can be configured such that these virtual groups do not show up as being selectable by a user (e.g., in a media casting, sender, application) as a playback device that is available for casting. The virtual group can be used, however, to utilize (leverage) functionality for media playback by predefined casting groups.

In certain implementations, playback devices that are added to a media cast for a group-on-demand can be considered to be "temporary" members of the corresponding playback group that is being casted to. Said another way, in such implementations, as soon as such a cast session stops (and an associated group-on-demand is unlaunched or disbanded), the temporary members can be configured to remove themselves from that group-on-demand.

In order to join an ongoing cast session (e.g., join a group-on-demand), playback devices in a multizone media casting system, such as the system 100, can be configured to be able to discover all in-process media casting sessions on a given network. For example, playback devices can be configured to listen to an mDNS service, where flags are used to indicate playback groups that are currently casting. In implementations that include groups-on-demand, because all casts can be associated with a group (including virtual groups for single device casts), the mDNS service can provide information about all current media casting sessions.

In an implementation, a currently casting device can be configured to send a signal to one or more other available casting devices on the same network to have those other devices join (playback) the same media cast as the currently casting device. The mDNS service noted above can be used by the currently casting device to identify the one or more other available casting devices. Note that playback devices that are already part of the casting group of the currently casting device (permanently or temporarily) can ignore this signal.

In order to provide media stream playback temporal synchronization between leader devices 130, 140 and follower devices 150, 160, 170 in a given media casting playback group in the system 100 (or other multizone media playback system), each follower device in a playback group can track a time offset between its (e.g., monotonic) system clock and the playback group leader's (e.g., monotonic) system clock. In an implementation, this offset can be determined using a round-trip-time based (RTT-based or rtt-based) method with weighted average smoothing and/or linear regression smoothing. Such approaches will be discussed in further detail below. With such temporal synchronization, leader devices and associated follower devices can account for network latency (e.g., variations in network quality, such as WiFi quality), which allows the leader device and follower devices of a given playback group to playback media at a same time (substantially a same time) without perceptible playback time delay from one playback device to another, thus improving a user's experience.

Briefly, time (clock) synchronization between devices in a playback group in the system 100 can be accomplished using unicast UDP request packets sent by a follower device (e.g., follower devices 150, 160, 170) to a corresponding leader device (e.g., leader devices 130, 140) containing the follower's current clock time. In other implementations, use of other protocols is possible. After receiving the request packet, the leader device can then respond with its own clock time and the follower's clock time copied from the request (e.g., so that the follower device does not need to track request order). The follower device can use this response to estimate the RTT and the clock offset.

In certain implementations, a follower device in the system 100 can send requests at a rate determined by the follower's clock offset error estimate (e.g., if the follower thinks it doesn't have a good estimate of the clock offset, it can send time synchronization requests more frequently). If a given playback group is not currently casting, follower devices of the given playback group can simply send such requests approximately once every 5 seconds. Such an approach can also be used be used to detect when a leader goes offline without notification. Once a media cast has been launched, the follower devices may increase their clock (time) sync request rates up to once every 50 milliseconds, or more frequently (with a minimum period of once every 5 seconds, depending on the offset accuracy).

In an example implementation, raw clock offset estimates can be smoothed using a moving linear regression with a window size of 10 minutes to provide an accurate clock offset estimate. In such approaches, the RTT estimates from time sync requests are smoothed and used to determine when NACKs should be sent for audio stream packets, such as using the example approaches discussed in detail below.

Follower devices of a casting group in the system 100 of FIG. 1, or in other multizone media casting systems, can all connect to an associated leader device (e.g., as soon as the leader is known) using a peer-to-peer transport control protocol (TCP) and set up a transport layer security (TLS) connection using any number of appropriate authentication techniques. When a multizone media cast is launched, the corresponding leader device can create a new random secret key which will be used for encryption of data sent between cast (playback) group members. This key can distributed to all follower devices over the respective TLS connections. If a follower device joins a playback group (comes online) partway through a cast, the leader can send the secret key to it as well. All media content (and other data) can be encrypted using the secret key using any number of appropriate encryption protocols. Clock (time) sync packets may not be encrypted or authenticated in any way. Control messages, however, may be encrypted and sent over the TLS connection.

When a group cast is launched, such as in the system 100 using the approaches described herein, a rendering process on the leader device for associated media content can be configured to redirect demuxed audio/video streams to a multizone (group) process for local playback (e.g. by the leader device) and for distribution (e.g., of audio data) to follower devices (e.g., for playback by the follower devices). This can be done using any number of appropriate media rendering services. Digital rights management can be managed using software, hardware and/or firmware, as appropriate for the particular implementation.

When a group launch request (e.g., group media playback request) is received, the designated leader device (e.g., determined using the approaches described herein) can send a launch notification to all followers over a TCP control channel. This notification can contain metadata about the requested group media cast and can also indicate that the follower devices should prepare for that media to be casted. In response to the launch notification, follower devices can increase their clock (time) sync request rates up to once every 50 milliseconds (if required/needed), where the time sync request rate for a given follower device can be based on that follower's clock offset error estimate. A launch notification can also sent to any follower that joins after the cast has begun.

Once audio data (of the requested cast) is available, the leader (e.g., the leader device 130) can stream it to all available follower devices (e.g., the follower devices 150 and 160). The audio data, in this example, can be streamed in the format described below. Each follower device can begin playback of the audio data once it has achieved a reasonably good clock offset estimate (e.g., when its respective clock offset error estimate is less than 5 milliseconds). In most instances, this playback will be immediate as there can be a period of several seconds between the cast launch request and media (e.g., audio data) beginning to stream, allowing sufficient time for clock synchronization between the leader device and it associated follower devices to be accomplished.

In the system 100, audio data (or other media data) can be streamed from, for example, the leader device 130 to the corresponding follower devices 150, 160 using real-time transport protocol (RTP) over user datagram protocol (UDP) with retransmissions (e.g., see RFC 4588). In implementations using RTP for audio streaming, each audio data stream can be identified using a distinct synchronized source (SSRC) ID in the appropriate RTP field. Retransmitted data will use the same SSRC ID as the originally sent data. A timestamp in each packet of audio data can be the playback time for that packet according to the leader's clock and each follower can use its clock offset estimate to determine the appropriate time to play each back to maintain time-synchronization with the leader device's playback.

In certain implementations, because individual content frames may be too large to fit in a single packet, such individual content frames can be split into multiple packets. In such approaches, the first 4 bytes of each packet can be a 16-bit frame ID and a 16-bit packet index, where the first packet in a given frame has an index of 0. Such index values can be in network byte order. The last packet in a frame can be indicated by setting a marker flag in an associated RTP header.

Follower devices (e.g., the follower devices 150 and 160) can send negative acknowledgements (NACKs) for missing packets (e.g., to the leader device 130) as soon as a missing packet is detected by the follower device (e.g., due to a sequence number gap). In order to limit bandwidth overhead associated with transmission of NACKs, NACKs may be sent no more frequently than, in an example implementation, once every 10 ms. In such an approach, if a NACK was sent in the past 10 ms, the corresponding follower device may wait until 10 ms after when the previous NACK was sent before sending another NACK. The NACK packet format can be as defined in RFC 4585.

In an implementation, a follower device of the system 100 may not send NACKs for packets that would expire before a response from an associated leader device is expected to arrive (e.g., based on a current RTT estimate). The expiry time for missing packets can be estimated as the expiry time for the next received packet. Also, the leader devices 130, 140 can be configured to not resend expired packets.

In such approaches, each sent NACK can have an associated timeout period for the NACKed packets to be resent, which can be determined as <RTT estimate>+<maximum jitter>. If a packet is still missing after the timeout period expires, it can be NACKed again as long as it has not expired (and will not expire before a response is expected to be received).

When a frame contains multiple packets, all packets in the frame can be expected to arrive within a certain interval (e.g., 10 ms). If some packets in a frame have not arrived after the expected interval (plus latency jitter) has elapsed, the missing packets can be NACKed. Also, if an inter-frame interval can be estimated, a NACK will be sent for the next packet after the last packet of the frame. The NACK check for the next packet can be timed to be (inter-frame interval+latency jitter).

In addition to authentication and key exchange, as discussed above, a TLS/TCP control channel (control channel) between a leader device and associated follower devices in the system 100 can be used by a leader device to send various commands corresponding with multizone (group) media playback to its associated (playback group) follower devices. Such commands can include start of media stream commands, pause/resume commands (which can include the leader device's timestamp at which to pause or resume, so that the followers can pause and resume in sync), end of media stream commands (which can include a sequence number and timestamp of a final media data frame), and/or volume control commands for the group playback. In other implementations, other commands can be used.

In the system 100, the follower devices (e.g., the follower devices 150, 160) can use the control channel to send information to their corresponding leader device (e.g., the leader device 130). Such information, for a given follower device, can include volume information (e.g., for determining volume adjustments on the given playback device in response to playback group volume adjustments made on the leader device), pause/resume/next/previous/stop notifications (e.g., if a user presses a button on the give follower device), and leaving the stream (leaving playback group) notifications (e.g., if the follower device receives a local (single device) cast launch request, or a group cast launch request from a different group).

A multizone manager of each playback device (such as shown in FIG. 2 and discussed in further detail below) can provide a mechanism for a sender application (e.g., on a media source device, such as the user devices 110 and 120) to control individual device volume for each casting group member whenever the group is in a launched (e.g., casting media) state. This can be done via a transport namespace (e.g., a multizone namespace).

For instance, when a playback group (e.g., a group media cast) is launched, the multizone manager can provide (implement) a group volume control mechanism. This volume control mechanism can allow sender apps (on a media source device) to control the volume of a group media cast in a coordinated fashion. For instance, a group volume reported to the sender app can be an average of the individual device volumes. If the volume setting of an individual playback device (leader or follower) changes (e.g., due to a volume control button press on the device, or by using a device-specific volume change application program interface (API)), the group volume can be adjusted (e.g., by respective multizone managers) accordingly, such as proportionally or by a corresponding amount.

For example, if a user increases a casting group's volume (by 10%, for example), such as from a sender app on a media source device, each playback device (e.g., leader and follower devices) in the associated playback group can increase its volume by that same amount (10%). In such an approach, if an individual device's volume would increase to over 100%, the volume of that device can be capped at 100% (which can then be reflected in the group volume discussed above).

If a user decreases the group volume, there can be a threshold (e.g., 10% of total possible volume for a given playback device) where the group volume behavior changes. For instance, if all playback device volumes are above the threshold, then each device volume may simply be decreased by the same amount as the user decrease (e.g., on the sender app). However, if a given playback device's volume is at or below the threshold, then the behavior may change, so that devices with higher volumes decrease their volume faster than devices that are already quiet (e.g., at volume settings below the threshold). This can be done by taking the entire requested volume change (e.g., the total change across all group members to make the desired change to the average volume) and dividing it between devices proportional to their individual device volumes. For example, if one device was at 10% and the other was at 90% (group volume=50%) and the user requests a group volume change to 40%, then the total change is 20% (10% times 2 devices), of which 2% applies to the quiet device (which goes to 8%) and 18% applies to the loud device (goes to 72%) resulting in a new average (group) volume of 40%.

When decreasing the playback group volume, if no playback devices are currently at or below the (low-volume) threshold, but the decrease would result in at least one device crossing the threshold, then the decrease can be divided evenly among the devices until one device hits the threshold. The remaining decrease can then be applied proportionately according to the below-threshold volume adjustment approach discussed above.

A casting group can be considered to be muted, as a whole, if and only if all of its members are muted. In certain implementations, a user may choose to mute/unmute an entire playback group, in which case all of its members will be muted/unmuted together (at a same time). To implement such mute/unmute functions, the multizone namespace can provide an application program interface (API) that is configured to mute/unmute individual group members and/or mute/unmute a playback group as a whole.

In certain implementations, the system 100 can be used to implement a multichannel configuration. For instance, in some implementation, a user may configure individual group members of a playback group to play only a single channel (e.g., left channel or right channel) of media that is being streamed. Such multichannel configuration can be done on a per-playback-group basis. For example, if a given playback device is a member of two playback groups, the given playback device could be configured to play only a left audio channel when a first audio playback group is playing media, and only play a right audio channel when a second playback group is playing media. In such implementations, when a follower device connects to a group leader, the follower device can send information on its channel (multichannel) configuration to the leader device. The leader device may be configured to then decide whether to only send the necessary channel(s) to each follower device (e.g., to reduce network bandwidth usage). In any case, such implementations, each playback device may only playback the desired channel(s) according to their respective multichannel configurations, where such playback can be time-synchronized using the approaches described herein.

FIG. 2 is a diagram illustrating an example implementation of the user device 110, the leader device 130 and the follower device 150 of the system 100 of FIG. 1, and communication (e.g., data network communication) between those components for multizone media streaming, according to an implementation. As noted above, the leader device 130 can be determined dynamically and elected from a group of media playback devices within a media casting group (playback group). Other components and elements than those shown in FIG. 2 can be included, or some of the illustrated components can be eliminated in certain implementations.

The devices of FIG. 2 may operate as follows. The playback devices (e.g., the leader device 130 and the follower device 150) can start up and start their respective media casting service. As a part of this startup, each playback device can create and initialize an instance of a respective multizone manager 212 and 242, including creating a time (clock) synchronization service. Each playback device can then come online and send out a service query, and announce its own casting services (e.g., in a respective service query), indicating which casting (playback) groups it is a member of (e.g., using UUIDs). Responses to the queries can be received and, from those responses, each playback device can determine which other playback devices on the network are members of the same playback groups that it is a member of.

For each playback group that a given playback device is a member of, the given playback device (e.g., in cooperation with other playback devices in each playback group) can then determine which playback device should be the group leader for that group (based on the leader quality information, such as the leadership metrics discussed above, contained in corresponding SRV and/or TXT records). In FIG. 2, the playback device 130 (as in FIG. 1) is determined to be the leader device and the playback device 150 is determined to be a follower device. Though only a single follower device is shown in FIG. 2, it will be appreciated that other follower devices can be included in the arrangement shown in FIG. 2 (such as in the system 100 in FIG. 1) and can operate in similar fashion as the follower device 150.

In this example, the follower device 150 can then create a follower group instance service (follower group) 236. The follower group 236 can create a control socket (e.g., a TCP/TLS connection) 238 to a leader group 216 instance of the leader device 130, and create a time sync requester 234, which can begin sending time sync request packets to the leader's time sync responder 214.

After being identified as the leader playback device, the leader device 130 can create the leader group instance 216 and begin accepting control socket connections for the corresponding playback group, such as from the follower device 150's control socket 238. The leader device 130 can also create and announce a casting service for the group (e.g., using an mDNS broadcast message). As noted above, the SRV record for the leader device 130 can indicate a port on the device (e.g., a virtual casting device port) that is specific to the group.

Casting media to a playback (casting) group using the arrangement shown in FIG. 2 can be performed as follows. A user can open a media casting app on the user device 110 (which could be a handheld device, a laptop/computer, or otherwise). The media casting app can send out a service query. Service responses (announcements) can then come back in response to the query, including the casting service for the group. The user can then select the group as a casting target. In response to the selection, a transport connection can be set up to a group-specific port (e.g., to a cast receiver 204 via a cast connection 202). Note that such a transport connection can also be used for controlling a single playback device casting session (e.g., for single device, non-group casting).

The cast receiver 204 can then start a content application 206. Once the content application 206 is started, the multizone manager 212 of the leader device 130 can receive an "app started" notification from the cast receiver 204. By checking the port that the app was started from, the multizone manager 212 can determine that the content application 206 was launched to cast media to the playback group for which the playback device 130 is the leader.

The multizone manager 212 can then tell the leader group instance 216 that the content application 206 is being launched. For instance, the multizone manager 212 can send a launch message to all connected follower devices, including the follower device 150, which can then increase their time (clock) sync request rate, such as described herein. The content application 206 can then open an audio output stream, which can be provided to a content streamer 220 and a synchronized audio output 222 of a local streamer service 218. For example, a call to create an output pipeline can be intercepted by the multizone manager 212, which can then be provided to the local streamer 218 by the multizone manager 212. The content application 206 can also configure the local streamer 218 for media playback. The multizone manager 212 can then tell the leader group instance 216 to send the audio configuration information to the follower device 150 (and any other follower devices of the leader device 130's casting group).

The content application 206 can then begin streaming media data, which can be obtained, by the content application 206 from, e.g., the Internet, the user device 110, or any other appropriate media data source. The local streamer 218, in this example, can timestamp each buffer of audio data to play one second in the future or 1 second ahead in the audio stream (based on the leader device 130's clock), pass the timestamped buffers to the local synchronized audio output 222, and also pass the timestamped buffers to the content streamer instance 220 to send to follower devices (e.g., follower device 150, etc.). The follower group 236's content receiver 230 can receive audio packets (as sub-parts of the timestamped audio buffers) and assemble them into the complete audio data buffers, requesting missing data where necessary. Each audio buffer's timestamp is adjusted to the local clock time based on the estimated clock offset from the time sync requester 234. The content receiver can then pass the audio buffer data to its synchronized audio output 242. The synchronized audio output instances 222 and 242 ensure that each audio buffer is played out (e.g., by the respective audio output pipelines 224 and 234) at the time indicated by the audio buffer's timestamp (e.g., based on the buffer timestamp and, for the follower device, its estimated clock offset).

In other implementations, the leader device 130 can attempt to further read-ahead, e.g., up to 5 seconds into a stream being played back. In certain implementations, when such a media cast is made to a predefined playback group, a 500 ms playback delay can be used to allow playback (follower) devices to buffer audio data. In other implementations, such as "groups-on-demand", as described herein, the leader device can start playback immediately upon receiving a casting requests (e.g., without timestamping buffers in the future). Since the buffer read-ahead is longer in such approaches (e.g., up to 5 seconds), such multizone casting systems can be more tolerant of temporary network failures that can cause breaks or drop outs in playback, because each group member can have up to 5 seconds of data buffered for media that is being streamed to an associated playback group.

In such approaches, the speed at which data is sent to followers can be rate-limited. If data is sent too fast, the bandwidth used may be higher than an associated network connection can support, which can lead to packet loss and packets being resent, further impacting bandwidth. In an example implementation, the data rate can be limited to 1.5× the playback rate for initial packets (i.e., not resent), and 2× the playback rate for resent packets.

When pausing/resuming playback in such approaches, a control message can be sent to follower devices with an expected timestamp of the pause/resume. Each follower device can then pause as soon as it gets the pause message, and resume playback (in response to the resume message) at the appropriate timestamp. In such implementations, the leader device 130 must keep track of how long the playback was paused, and include this interval (paused time period) in the resume message to its follower devices. The follower devices can then update their buffered data timestamps accordingly, so that the resumed playback is still time-synchronized.

In group-on-demand implementations, if a media cast is initially casted to a single playback device, an audio playback delay of zero can be implemented (e.g., instead of the 500 ms audio playback delay discussed above that can be used for predefined group casts). Such use of a zero delay may not result in any audio quality issues as, for a cast that is initially to a single playback devices, there are (at least initially) no followers for which playback needs to be time-synchronized when the cast is started. The predefined group cast audio delay is to allow all group members to start playback at the start of the cast.

In the techniques described herein, the intent of time (clock) synchronization, e.g., between the leader device 130 and the follower device 150, is to measure a RTT between two devices, and use that measure of RTT to calculate a clock offset. For instance, a requester can send a time sync request packet to a responder with an initial send time (time_1). The responder can receive the packet, add its current time (time_2) to the packet and then send the packet back to the requester as a response to the time sync request. The requester, upon receiving the response, can then get its current time (e.g., a time the response is received, referred to below as (now)).

If transmission latency in both directions of the round trip is the same, it could be determined that time_2−time_1=−offset+latency, and now−time_2=offset+latency. Therefore, a clock offset can be estimated as ((now−time_2)−(time_2−time_1))/2.

However, in many instances, transmission latency is not the same in both round-trip directions. For example, in a WiFi network, transmission latency in each direction can be randomly distributed. This means that for a given RTT, the offset estimate can be incorrect by up to RTT/2. It will be noted that the calculated latency can also include variations due to process scheduling (in the playback devices) and clock precision. Such effects, however, can be relatively small (e.g., on the order of tens of microseconds), as compared to directional RTT variation due to WiFi.

In order to account for the variation in transmission latency, such as in the approaches described herein, multiple samples can be used to improve clock offset estimates. In an example implementation, the error of a given sample can be initially estimated by (RTT/2). A simple weighted average of the samples can then be used, where the weight=1/error$^2$=1/RTT$^2$. This approach can be used initially to quickly determine an accurate clock offset estimate (even with 1 sample, if the RTT is low). The error of the weighted average can be approximated by the weighted sum of the sample errors.

However, in some implementations, using the weighted average may not provide an estimate of clock drift, and can introduce a consistent bias if one clock is faster than the other (e.g., where the bias is equal to ½ the clock drift over the averaging period). Accordingly, as described herein, a moving weighted linear regression can be used to accurately estimate a clock offset and also account for any clock drift rates. In example implementations, it may be more accurate to use a moving linear regression window (with a relatively long window period, e.g., on the order of 5 to 10 minutes), so as to account for any changes in clock drift rate over time.

In the example of FIG. 2, the multizone manager 232 of the follower device 150 can maintain both a moving average and a moving linear regression estimate of clock offset, and produce a final clock offset estimate as a weighted average of the two results based on the estimated errors from each. Also, the moving average estimate weight can decrease linearly to 0 after an initial period has passed. An empirical example of using such an approach for clock offset estimation is provided below.

In this empirical example two devices, a "leader" device (leader device 130) and a "follower" device (follower device 150), such as shown in FIG. 2, are described. Other sets of leader and follower devices can also be time-synchronized using such approaches. Also, in this example, the follower device 150 is attempting to estimate an offset between its system clock and the leader device 130's system clock. The two devices are communicating over a WiFi network.

Initially, in this example, the leader device 130's clock is 1000000 (microseconds) and the follower device 150's clock is 2000000. The leader device 130's clock will have (has) a 20 ppm drift, so in 1 second it will increase by 1000020. The follower device 150's clock has no appreciable drift in this example. Note that the follower device 150, in this example, has no way to determine the leader's exact clock value at any given time, or to determine the drift rate of either clock.

In this empirical example, the follower device 150 sends out an initial request (e.g., time sync request) to the leader device 130, containing its current clock value (2000000). This request takes 50000 microseconds to arrive at the leader device 130. The leader device 130 sends a response back to the follower device 150 containing its current clock value (1050001) and the follower device 150's clock value from the request. The response takes 10000 microseconds to return to the follower device 150. When the follower device 150 receives the response, it gets the current time (2060000). The follower device 150 can then calculate the roundtrip time (2060000−2000000=60000) and the offset estimate ((2060000−1050001)−(1050001−2000000))/2=980000 microseconds. The follower device 150 now has one sample (time=2060000, offset=980000, weight=1/RTT$^2$=2.78* $10^{-10}$). This sample is added to a weighted linear regression, and to a weighted average. In this example, an offset estimate based on the linear regression and/or the weighted average cannot yet be calculated yet, because the linear regression requires at least 3 samples to accurately estimate the error, and the weighted average requires at least 2 samples to accurately estimate the error.

Continuing with the foregoing example, the follower device 150 can then make another time sync request when its clock reaches 2100000. This time, the request takes 5 ms to reach the leader (at 1105002 on the leader device 130's clock), and the response takes 5 ms to return (at 2110000 on the follower device 150's clock). The RTT is 10000 and the offset estimate is 999998. The follower device can then add another sample (time=2110000, offset=999998, weight=1.0*$10^{-8}$) to the linear regression and the weighted average.

At this point in this example, the offset and error can be estimated using the weighted average. The weighted average is (980000*2.78*$10^{-10}$+999998*1.0*$10^{-8}$)/(2.78*$10^{-10}$+1.0*$10^{-8}$)=999458 microseconds. The weighted variance is (2.78*10−10*(980000−999458)2+1.0*10−8*(999998−−999458)$^2$)/(2.78*$10^{-10}$+1.0*$10^{-8}$)=10516521, and the standard error is 3243. The linear regression cannot yet be used to make an estimate as only two RTT samples have been obtained. Therefore, the current estimate of the clock offset is 999998 microseconds, with an error estimate of 3243 microseconds (based on the two-sample weighted average).

Again continuing with the above example, the follower device 150 can make a third time sync request when its clock reaches 2200000. The third request, in this example, takes 10 ms to reach the leader device 130 (at 1210004 on the leader device 130's clock) and 20 ms to return to the follower (at 2230000 on the follower device 150's clock). The RTT is 30000 and the offset estimate is 1004996. The follower can now add another (third) sample (time=2230000, offset=1004996, weight=1.11*$10^{-9}$) to the linear regression and the weighted average.

The weighted average is now (980000*2.78*$10^{-10}$+999998*1.0*$10^{-8}$+1004996*1.11*$10^{-9}$)/(2.78*$10^{-10}$+1.0*$10^{-8}$+1.11*$10^{-9}$)=999997 microseconds. The weighted variance is (2.78*$10^{-10}$*(980000−999997)$^2$+1.0*$10^{-8}$* (999998 999997)$^2$+1.11*$10^{-9}$*(1004996 999997)$^2$)/ (2.78*$10^{-10}$+1.0*$10^{-8}$+1.11*$10^{-9}$)=12197537, and the standard error is 3492.

As three samples have been obtained, the weighted linear regression can now be calculated, where the x values are the times that the samples were taken, and the y values are the offsets for each sample. The weighted mean of x is 2120476, and the weighted mean of y is 999997. The weighted covariance is sum(weight[i] *(x[i] x_mean)*(y[i] y_mean))/sum(weight[i])=82879170. The x variance is sum (weight[i] *(x[i] x_mean)$^2$)/sum(weight[i])=1354866562. The y variance is 12197537. The slope is then the covariance/x_variance=0.06117. The current x difference is (current time x_mean)=109524, and the estimated offset is y_mean+slope*x_diff=1006697.

The residual sum of squares is covariance$^2$*sum(weight [i])/x_variance=0.05773, and the mean squared error is y_variance−rss=0.08117. The slope variance is mse/x_variance=0.0052608. The intercept variance is slope_variance*x_variance=7127697. The calculated y error is then sqrt(intercept_variance+ slope_variance*x_diff$^2$)=8381. The 98% confidence interval of the offset estimate can then be calculated by multiplying by the 99th quantile of a student's t-distribution with 1 degree of freedom (31.82), giving a final error estimate for the linear regression of 266670 microseconds. A 98% confidence interval was chosen, in this example, because it produced good time-synchronization results in the associated empirical testing.

The final offset estimate and error can then be calculated as a weighted average of the estimate from the weighted average and the estimate from the linear regression. The weight for the linear regression estimate is $1/(\text{linear error}^2) = 1.406 \times 10{-}11$. In this example, the weight for the weighted average estimate is (age weight/avg_error$^2$), where age weight decreases linearly from 1 at the start of time synchronization to 0 after 5 minutes. In other implementations, other time periods (other than 5 minutes) can be used during which age weight decreases to 0. In the above example, since 230000 microseconds have passed since the start of estimation, the age weight is 0.9992, the weight for the weighted average estimate is $8.194 \times 10^{-8}$. Therefore, the final combined offset estimate is 999998 microseconds, with an error estimate of 3493 microseconds.

The follower device 150 can then continue to make time sync requests and add more samples to the weighted average and the linear regression. As time goes on, the linear regression estimate will become much more accurate (the variance decreases, and the t-distribution multiplier drops quickly as the number of samples increases). The weighted average estimate may eventually become inaccurate due to the clock drift. For example, a last 5 minutes of samples are used to compute the weighted average, the calculated offset will be incorrect by 3000 microseconds (since the clock drifts by 20 microseconds per second).

Note that in this example, time sync requests were made every 100 ms. In other implementations, the request frequency can vary (e.g., at runtime) based on a current error estimate, and the system (e.g., system 100) state. If synchronized time will be needed soon (e.g., time-synchronized audio playback for a playback group is about to start), the time sync request frequency can be increased to improve the time offset estimate.

In other implementations, instead of determining clock offset/error by adding (sample, weight) to the linear regression and moving average, (sample−latency, weight) and (sample+latency, weight) can be added to the linear regression and moving average, where latency=RTT/2. Such an approach can improve the accuracy of the error estimate, as well as reduce the time to determine error with enough precision to allow for time-synchronized playback. In such an approach, audio playback can begin with an error estimate that is sufficiently accurate to prevent perceptible audio distortions that may occur when the clock offset error is corrected (converges) using other approaches. Mathematically, this approach can be implemented using only two measurements (as described above) to start using the linear regression for error estimation, and one measurement for using the moving average. In certain implementations, however, additional measurements can be made prior to estimating clock offset/error. For, instance, in an implementation, at least 2 measurements can be taken before using the moving average, and 15 measurements can be taken before starting to use the linear regression. In other implementations, other respective numbers of samples can be taken before using the moving average or the linear regression to estimate error (offset).

Different speakers/audio output devices can have different inherent output delays, e.g., after the audio samples have been pushed to corresponding audio pipeline hardware, the delay until the corresponding sound is produced can vary significantly between different speakers. The difference can be up to a few hundred milliseconds.

In order to improve synchronization between different speakers in a multizone casting (playback) group, the inherent output delay of each speaker can be determined and compensated for by adjusting the software output of samples so that the actual sounds are produced simultaneously. Note that, in such an approach, the absolute delay of each speaker does not need to be determined, just the delay of each speaker relative to a common reference point, which can be determined, for example, using the example implementation described below.

In this example implementation, a user's handheld device can be used as a common reference point. For each speaker (e.g., of playback devices of a given playback group), the user can hold the handheld device next to the speaker and run a calibration application (e.g., by pressing a "calibrate" button). The calibration application can be configured to have both the cast (playback) device and the user's handheld device play a sound (same sound) at known, common timestamps. The handheld device will record the played sounds from both devices and use the time difference between them to determine the actual output latency of the speaker system (relative to the output latency of the handheld device).

Such playback device audio (speaker) latency calibration can accomplished using the following example approach. In this example, a casting device for which audio latency calibration is being performed can achieve time synchronization with the internal clock on a handheld device being used for audio latency calibration. This time synchronization can be achieved using the time synchronization approaches described herein. After time synchronization is achieved, the handheld device can determine an appropriate volume level to use when playing the sound. For instance, in order for the calibration to work properly, a volume of the sound received at the handheld device from the cast (playback) device should be within, e.g., 12 dB of a volume of the sound from the handheld device. To achieve this, the handheld device can play the sound initially while recording, and then instruct the speaker to play the sound while recording. If needed (e.g., if the volume of the sound that the handheld device receives from itself is >12 dB away from the received volume from the speaker), the handheld device can adjust its output volume and repeat the above process.

Once time synchronization and acceptable volume levels are determined, the handheld device can determine (get, obtain, etc.) its current timestamp N. The handheld device can then instruct the cast (playback) device to play the predefined sound at a given timestamp Tc=N+Dc (where Dc is a delay value, e.g., Dc can be initially be 100 ms and change over iterations of the calibration process) relative to the handheld device's internal clock. This process can use the approaches used in multizone time-synchronized media streaming to play the sound at a given, remote (remote to the handheld device) timestamp on the cast (playback) device. The handheld device can then begin recording (at an appropriate time) to capture playback of the sound by the playback device being calibrated. Further, the handheld device can play the sound at a timestamp Th=N+Dh (Dh=e.g., 100 ms) close to the time that the playback device is supposed to play the sound. The actual time (Ta) that the sound is played by the handheld device can be determined using getTimestamp function of the handheld device.

In this example, the sounds from both the handheld device and the playback device will be recorded, where recording can stop after enough time has passed that both sounds should have completed playing, e.g., Th+300 ms. A time delta (difference) between the two recorded sounds can then be determined using signal processing. The value of this difference can, for this first iteration, be determined as an absolute value (e.g., as it may not be known which device, handheld device or playback device, played the sound first). Therefore, the measurement must be repeated (at least once) with modified timestamps to get the sign of the difference. For instance the above process can repeat from the point where the handheld device obtains its current timestamp, but changing the timestamps the handheld (Th) and playback device (Tc) play the sound, such that the playback device should play the sound 20 ms earlier than the previous iteration (e.g., Dc=80 ms in this example).

After the first two iterations are complete, if the time delta (difference) increased between the first two iterations, then the sign of the difference can be determined to be negative, otherwise the difference is positive. The delay for the playback device/speakers being calibrated can then be determined by (delta (Tc−Ta)). This value can then be sent to the playback device as the calibrated audio delay for the given speaker, which can be used by the playback device to maintain audio playback synchronization between playback devices for a corresponding playback (media casting) group. The particular values, times and number of iterations used for the foregoing audio latency calibration process can vary and will depend, at least in part, on the specific implementation.

Figure 3:
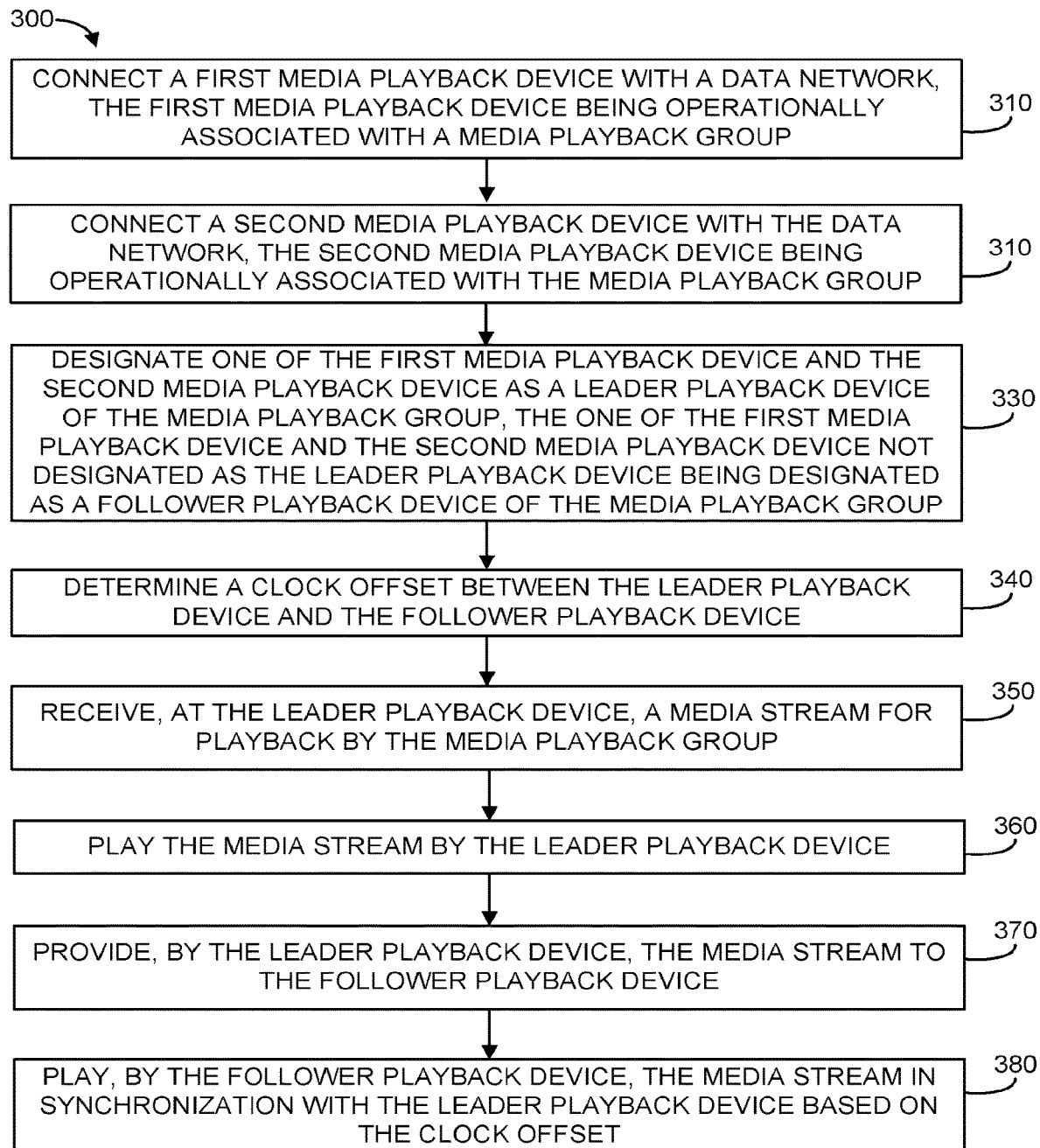
FIG. 3 is a flowchart illustrating a method for time-synchronized media playback to a media playback group including a plurality of playback devices.

FIG. 3 is a flowchart illustrating a method 300 for time-synchronized media playback to a media playback group including a plurality of playback devices. The method 300 shown in FIG. 3, as well as the methods of FIGS. 4-9, can be implemented in the system 100 of FIG. 1 and/or using the leader device 130 and the follower device 150 illustrated in FIG. 2 (and other follower devices). Also, the methods of FIGS. 3-9 can be implemented using the approaches discussed herein, though the specific details of those approaches may not be repeated with reference to the flowcharts of FIGS. 3-9. Further, it will be appreciated that the methods of FIGS. 3-9 can be implemented in media playback systems having configurations other than those illustrated in FIGS. 1 and 2.

As shown in FIG. 3, the method 300 can include, at block 310, connecting a first media playback device with a data network, where the first media playback device is operationally associated with a (first) media playback group. At block 320, the method 300 can include connecting a second media playback device with the data network, where the second media playback device is operationally associated with the media playback group. Connecting the first media playback device and the second media playback device with the data network can include the first media playback device and the second media playback device sending respective broadcast messages on the data network announcing their membership in the media playback group and including respective queries for other devices connected with the data network that are members of the media playback group. As described herein, the first media playback device and the second media playback device can also be operatively associated with other media playback groups (e.g., as leader devices and/or follower devices).

At block 330, the method 300 can include designating one of the first media playback device and the second media playback device as a leader playback device of the media playback group. In the method 300, the one of the first media playback device and the second media playback device not designated as the leader playback device in the method 300, is designated as a follower playback device of the media playback group. As described herein, the designation of a leader playback device can be based on respective leadership metrics for the first media playback device and the second media playback device, the leadership metrics being based on respective attributes for network connections (e.g., network connection quality) of the first media playback device and the second media playback device. In other approaches, the designation of the leader device and the follower device for the first media playback device and the second media playback device can be preconfigured.

At block 340, the method 300 can include determining a clock offset between the leader playback device and the follower playback device, where the clock offset can be determined using the approaches described herein (e.g., by calculating a weighted average and/or a linear regression based on RTTs). At block 350, the method 300 can include receiving, at the leader playback device, a media stream for playback by the media playback group.

At block 360, the method 300 can include playing the media stream by the leader playback device. At block 370, the method 300 can include providing, by the leader playback device, the media stream to the follower playback device, which can include providing the media stream to the follower playback device in a sequence of timestamped data packets. At block 380, the method 300 can include playing, by the follower playback device, the media stream in synchronization with the leader playback device based on the clock offset (and respective timestamps of the packets). The method 300 can also include, buffering, by the leader playback device and the follower playback device, respective portions of the media stream, such as described herein.

Figure 4:
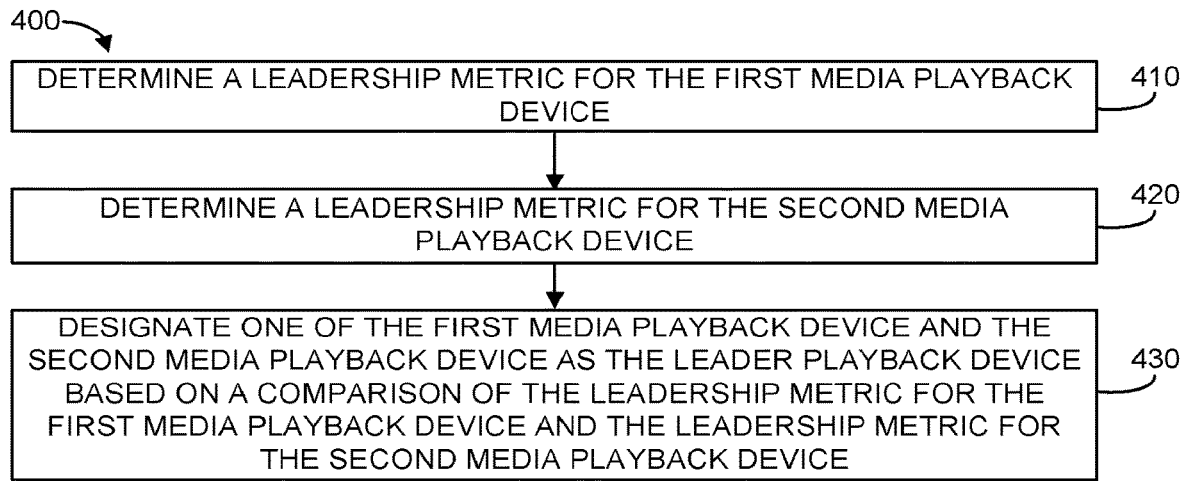
FIG. 4 is a flowchart illustrating a method for designating a leader device of a media playback group.

FIG. 4 is a flowchart illustrating a method 400 for designating a leader device of a media playback group. In an implementation, the method 400 can be implemented at block 330 of the method 300.

As shown in FIG. 4, the method 400 can include, at block 410, determining a leadership metric for the first media playback device and, at block 420, determining a leadership metric for the second media playback device. At block 430, the method 400 can include designating one of the first media playback device and the second media playback device as the leader playback device based on a comparison of the leadership metric for the first media playback device and the leadership metric for the second media playback device. For instance, the playback device with a higher (greater, larger, etc.) effective_SNR value can be designated as the leader device.

The determination at block 430 can include determining a leader between playback devices with equal leadership metrics, such as by comparing IP addresses of the playback devices and designating a leader device based on that comparison. In the method 400, the leadership metric for the first media playback device, at block 410, can be based on one or more attributes of a network connection of the first media playback with the data network. Likewise, the leadership metric for the second media playback device, at block 420, can be based on one or more attributes of a network connection of the second media playback with the data network.

Figure 5:
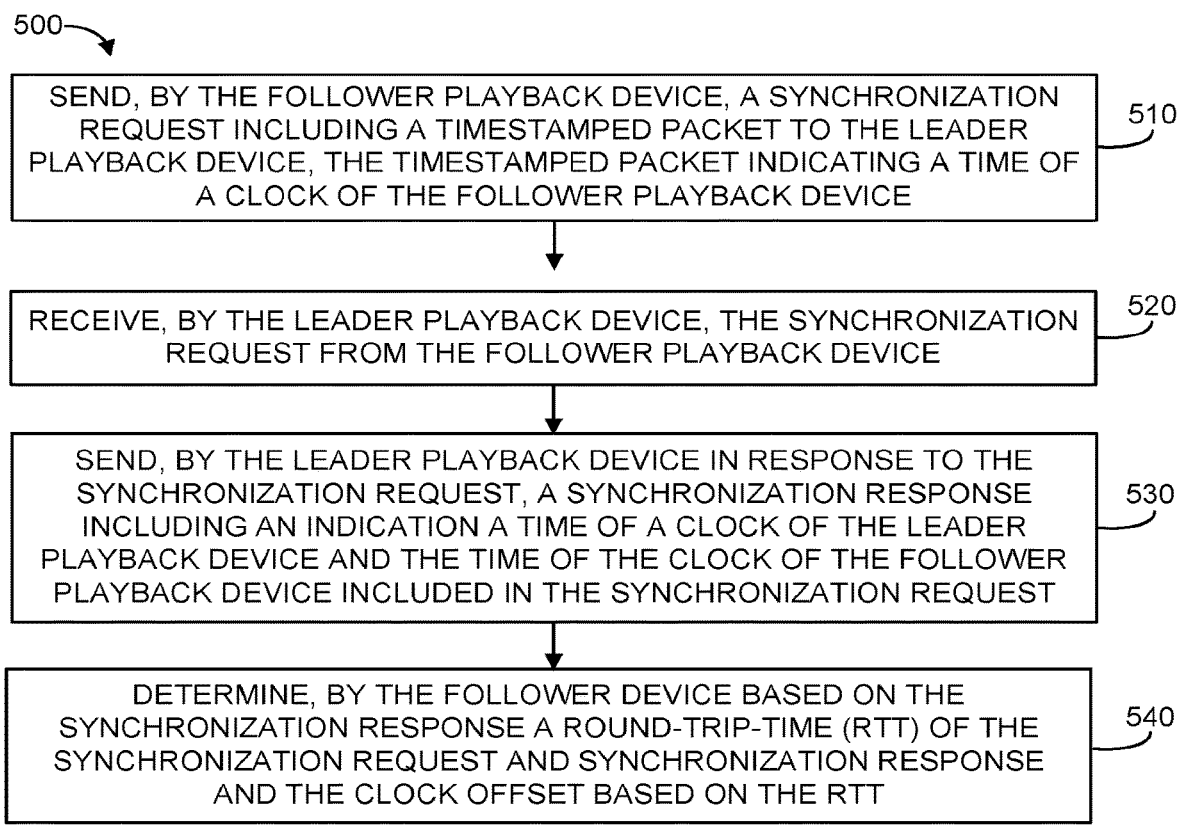
FIG. 5 is a flowchart illustrating a method for determining a clock offset between a leader device and a follower device of a media playback group.

FIG. 5 is a flowchart illustrating a method 500 for determining a clock offset between a leader device and a follower device of a media playback group. In an implementation, the clock offset can be determined by iteratively performing (e.g., prior to, and during media playback) the operations of the method 500. The method 500 can be implemented using the approaches described herein (e.g., including calculating a weighted average and/or a linear regression).

At block 510, the method 500 can include sending, by the follower playback device, a synchronization request including a timestamped packet to the leader playback device, the timestamped packet indicating a time of a clock of the follower playback device. At block 520, the method 500 can include receiving, by the leader playback device, the synchronization request from the follower playback device. At block 530, the method 500 can include sending, by the leader playback device in response to the synchronization request, a synchronization response including an indication a time of a clock of the leader playback device and the time of the clock of the follower playback device included in the synchronization request. At block 540, the method 500 can include determining, by the follower device based on the synchronization response, a round-trip-time (RTT) of the synchronization request and synchronization response and the clock offset based on the RTT. In the method 500, determining the RTT can include calculating at least one of a weighted moving average and a linear regression based on two or more (iterative) synchronization request and synchronization response sequences.

Figure 6:
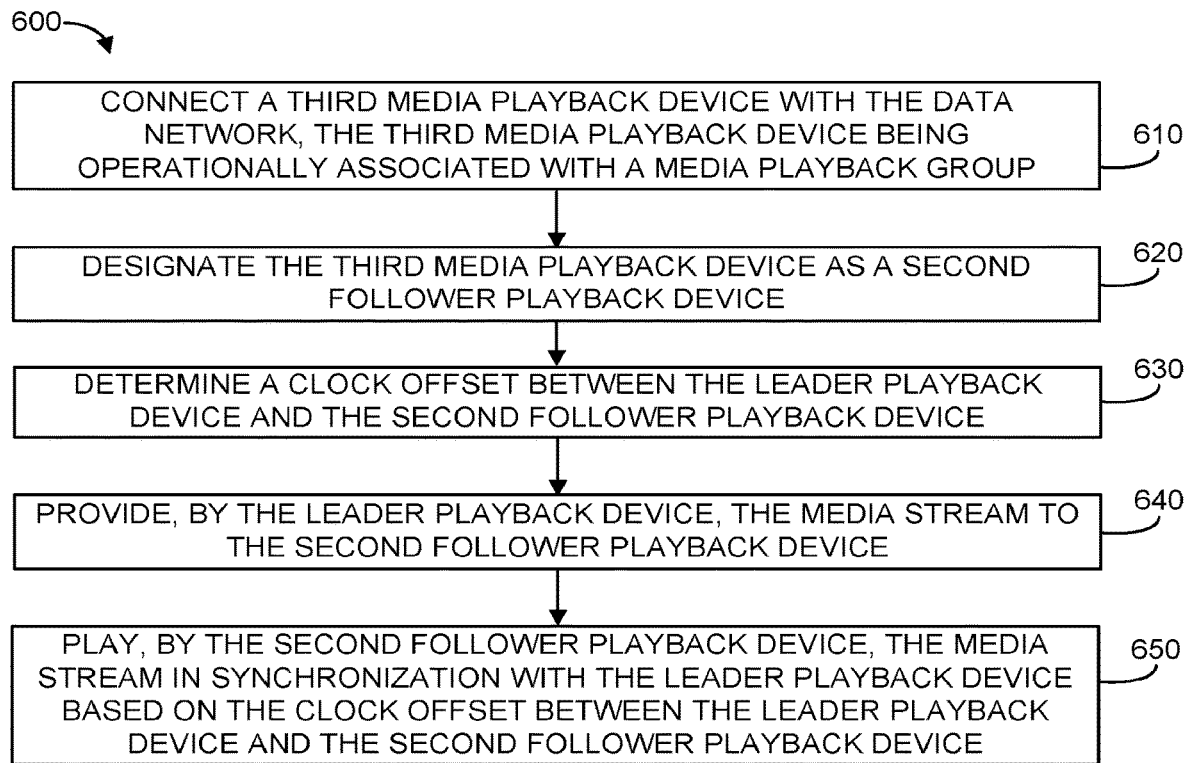
FIG. 6 is a flowchart illustrating a method for adding a playback device to a media playback group that is currently playing media.

FIG. 6 is a flowchart illustrating a method 600 for adding a playback device to a media playback group that is currently playing media, such as adding a third playback device to the media playback group of the method of FIG. 3. For instance, the follower playback device of the method 300 can be a first follower playback device.

At block 610, the method 600, when implemented in conjunction with the method 300, can include connecting a third media playback device with the data network, where the third media playback device is operationally associated with the media playback group. At block 620, the method 600 can include designating the third media playback device as a second follower playback device. At block 630, the method 600 can include determining a clock offset between the leader playback device and the second follower playback device, such as using the approaches described herein. The method 600 can further include, at block 640, providing, by the leader playback device, the media stream to the second follower playback device and, at block 650, playing, by the second follower playback device, the media stream in synchronization with the leader playback device based on the clock offset between the leader playback device and the second follower playback device.

Figure 7:
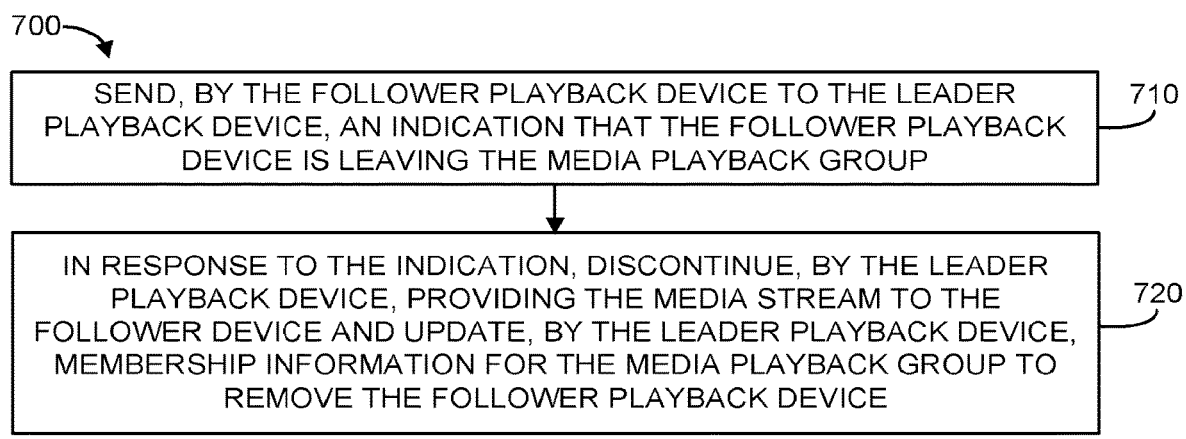
FIG. 7 is a flowchart illustrating a method for a playback device leaving a media playback group.

FIG. 7 is a flowchart illustrating a method 700 for a playback device, such as the follower playback device of the method 300, leaving a media playback group. At block 710, the method 700 can include (e.g., when implemented in conjunction with the method 300), sending, by the follower playback device to the leader playback device, an indication that the follower playback device is leaving the media playback group. At block 720, the method 700 can include, in response to the indication, discontinuing, by the leader playback device, providing the media stream to the follower device and updating, by the leader playback device, membership information for the media playback group to remove the follower playback device.

Figure 8:
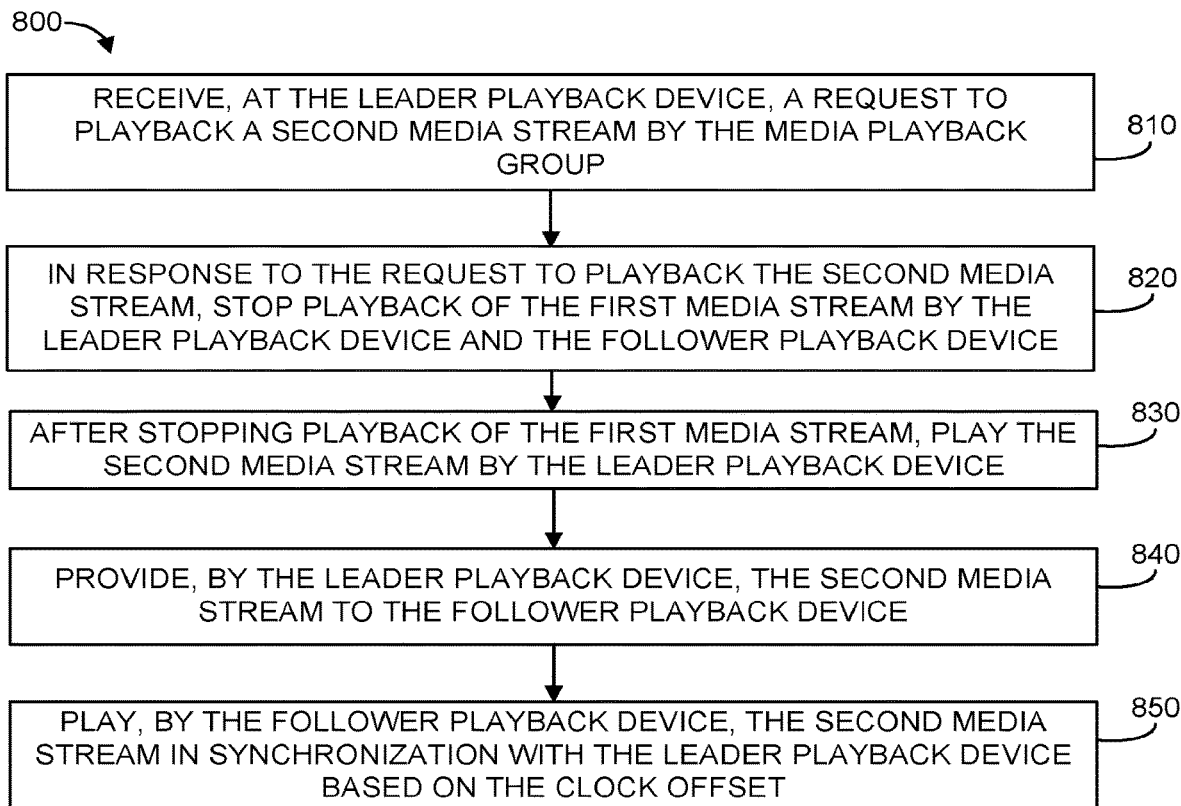
FIG. 8 is a flowchart illustrating a method for changing a media stream that is being played by a media playback group.

FIG. 8 is a flowchart illustrating a method 800 for changing a media stream that is being played by a media playback group. As with the methods 600 and 700, the method 800 can be implemented in conjunction with the method 300 of FIG. 3, where the media stream of the method 300 is a first media stream.

At block 810, the method 800 can include receiving, at the leader playback device, a request to playback a second media stream by the media playback group. In response to the request to playback the second media stream, the method 800 can include, at block 820, stopping playback of the first media stream by the leader playback device and the follower playback device. After stopping playback of the first media stream at block 820, the method 800 can include, at block 830, playing the second media stream by the leader playback device and, at block 840, providing, by the leader playback device, the second media stream to the follower playback device. At block 850, the method 800 can include playing, by the follower playback device, the second media stream in synchronization with the leader playback device based on the clock offset.

Figure 9:
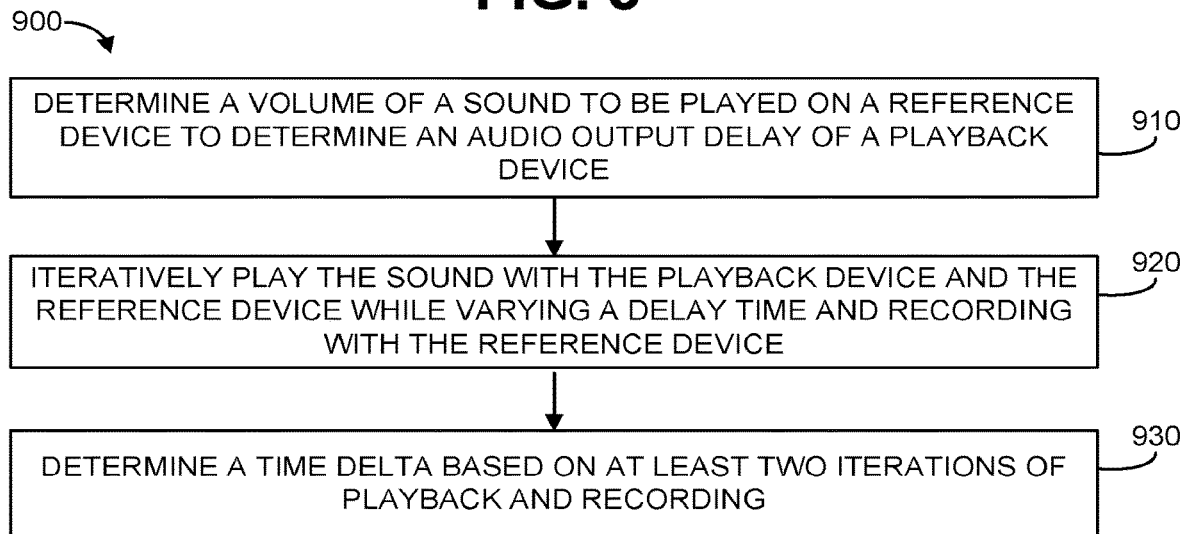
FIG. 9 is a flowchart illustrating a method for determining an audio output delay of a media playback device.

FIG. 9 is a flowchart illustrating a method 900 for determining an audio output delay of a media playback device. The method 900 can be implemented using the approaches for determining audio output delay described herein.

At block 910, the method 900 can include determining a volume of a sound to be played on (by) a reference device (e.g., a handheld device, such as a smartphone), where the sound is used to determine an audio output delay of the playback device. At block 920, the method 900 can include iteratively playing the sound with the playback device and the reference device while varying a playback delay (playback offset) for each iteration. Also, at block 920, the reference device can record playback of the sound from both the playback device and the reference device for each iteration. At block 930, the method 900 can include determining a time delta (audio playback delay) based on at least two iterations of playback and recording. In an implementation, playing, by the follower playback device, the media stream in synchronization with the leader playback device can include playing, by the follower playback device, the media stream in synchronization with the leader playback device based on the clock offset and the output delay of the follower playback device determined using the method 900.

In a general aspect, a system for media playback can include a media casting device configured to broadcast a media stream to a data network for playback by a media playback group; a first media playback device configured to receive the media stream, the first media playback device being a member of the media playback group; and a second media playback device configured to receive the media stream, the second media playback device being a member of the media playback group. The first media playback device and the second media playback device can be collectively configured to designate one of the first media playback device and the second media playback device as a leader playback device of the media playback group. The one of the first media playback device and the second media playback device not designated as the leader playback device can be designated as a follower playback device of the media playback group. The first media playback device and the second media playback device can be further collectively configured to determine a clock offset between the leader playback device and the follower playback device. The leader playback device can be configured to receive the broadcast of the media stream from the data network; play the media stream; and provide the media stream to the follower playback device. The follower playback device can be configured to play the media stream in synchronization with the leader playback device based on the clock offset.

Implementations can include one or more of the following features. For instance, the first media playback device and the second media playback device can each include a respective record indicating membership in the media playback group. The media playback group can be a first media playback group, and the respective record of the first media playback device can further indicate membership in a second media playback group.

The system can include a third media playback device configured to receive the media stream. The third media playback device can be a member of the media playback group. The third media playback device and the leader playback device can be collectively configured to determine a clock offset between the leader playback device and the third playback device. The leader playback device can be configured to provide the media stream to the third media playback device. The third media playback device can be configured to play the media stream in synchronization with the leader playback device based on the clock offset between the leader playback device and the third playback device.

Designating one of the first media playback device and the second media playback device as a leader playback device of the media playback group can include comparing a measure of quality of a data connection of the first media playback device with the data network and a measure of quality of a data connection of the second media playback device with the data network.

Each of the first media playback device and the second media playback device can be configured to implement a broadcast service to broadcast a message indicating membership in the media playback group. The broadcasted message can include a query requesting a response from media playback devices that are connected to the data network and members of the media playback group.

The leader playback device providing the media stream to the follower playback device can include providing the media stream to the follower playback device in a sequence of timestamped data packets.

Playing, by the follower playback device, the media stream in synchronization with the leader playback device based on the clock offset can include playing, by the follower playback device, the media stream in synchronization with the leader playback device based on the clock offset and an output delay of the follower playback device. The clock offset can be determined based on a round-trip-time (RTT) between the leader playback device and the follower playback device.

In another general aspect, a method can include connecting a first media playback device with a data network, the first media playback device being operationally associated with a media playback group and connecting a second media playback device with the data network, the second media playback device being operationally associated with the media playback group. The method can further include designating one of the first media playback device and the second media playback device as a leader playback device of the media playback group, where the one of the first media playback device and the second media playback device not designated as the leader playback device can be designated as a follower playback device of the media playback group. The method can also include determining a clock offset between the leader playback device and the follower playback device; receiving, at the leader playback device, a media stream for playback by the media playback group and playing the media stream by the leader playback device. The method can still further include providing, by the leader playback device, the media stream to the follower playback device and playing, by the follower playback device, the media stream in synchronization with the leader playback device based on the clock offset.

Implementations can include one or more of the following features. For instance, connecting the first media playback device with the data network can include the first media playback device sending a broadcast message indicating the first media playback device's membership in the media playback group. The broadcast message can include a query requesting a response from media playback devices that are connected to the data network and operationally associated with the media playback group. The media playback group can be a first media playback group and the broadcast message can indicate the first media playback device's membership in a second media playback group. Connecting the second media playback device with the data network can include the second media playback device sending a broadcast message indicating the second media playback device's membership in the media playback group.

Designating one of the first media playback device and the second media playback device as the leader playback device can include determining a leadership metric for the first media playback device; determining a leadership metric for the second media playback device; and designating one of the first media playback device and the second media playback device as the leader playback device based on a comparison of the leadership metric for the first media playback device and the leadership metric for the second media playback device. The leadership metric for the first media playback device can be based on one or more attributes of a network connection of the first media playback with the data network. The leadership metric for the second media playback device can be based on one or more attributes of a network connection of the second media playback with the data network.

Determining the clock offset between the leader playback device and the follower playback device can include, iteratively: sending, by the follower playback device, a synchronization request including a timestamped packet to the leader playback device, the timestamped packet indicating a time of a clock of the follower playback device; receiving, by the leader playback device, the synchronization request from the follower playback device; sending, by the leader playback device in response to the synchronization request, a synchronization response including an indication a time of a clock of the leader playback device and the time of the clock of the follower playback device included in the synchronization request; and determining, by the follower device based on the synchronization response: a round-trip-time (RTT) of the synchronization request and synchronization response; and the clock offset based on the RTT. Determining the RTT can include calculating at least one of a weighted moving average and a linear regression based on two or more synchronization responses.

Providing the media stream to the follower playback device can include providing the media stream to the follower playback device in a sequence of timestamped data packets. The method can include buffering, by the leader playback device and the follower playback device, respective portions of the media stream.

The follower playback device can be a first follower playback device, and the method can include connecting a third media playback device with the data network. The third media playback device can be operationally associated with the media playback group. The method can include designating the third media playback device as a second follower playback device and determining a clock offset between the leader playback device and the second follower playback device. The method can include providing, by the leader playback device, the media stream to the second follower playback device and, playing by the second follower playback device, the media stream in synchronization with the leader playback device based on the clock offset between the leader playback device and the second follower playback device.

The method can include sending, by the follower playback device to the leader playback device, an indication that the follower playback device is leaving the media playback group. In response to the indication, the method can include discontinuing, by the leader playback device, providing the media stream to the follower device and updating, by the leader playback device, membership information for the media playback group to remove the follower playback device.

Playing, by the follower playback device, the media stream in synchronization with the leader playback device based on the clock offset can include playing, by the follower playback device, the media stream in synchronization with the leader playback device based on the clock offset and an output delay of the follower playback device.

The media stream can be a first media stream, and the method can include receiving, at the leader playback device, a request to playback a second media stream by the media playback group. In response to the request to playback the second media stream, the method can include stopping playback of the first media stream by the leader playback device and the follower playback device. After stopping playback of the first media stream, the method can include playing the second media stream by the leader playback device; providing, by the leader playback device, the second media stream to the follower playback device; and playing, by the follower playback device, the second media stream in synchronization with the leader playback device based on the clock offset.

Figure 10:
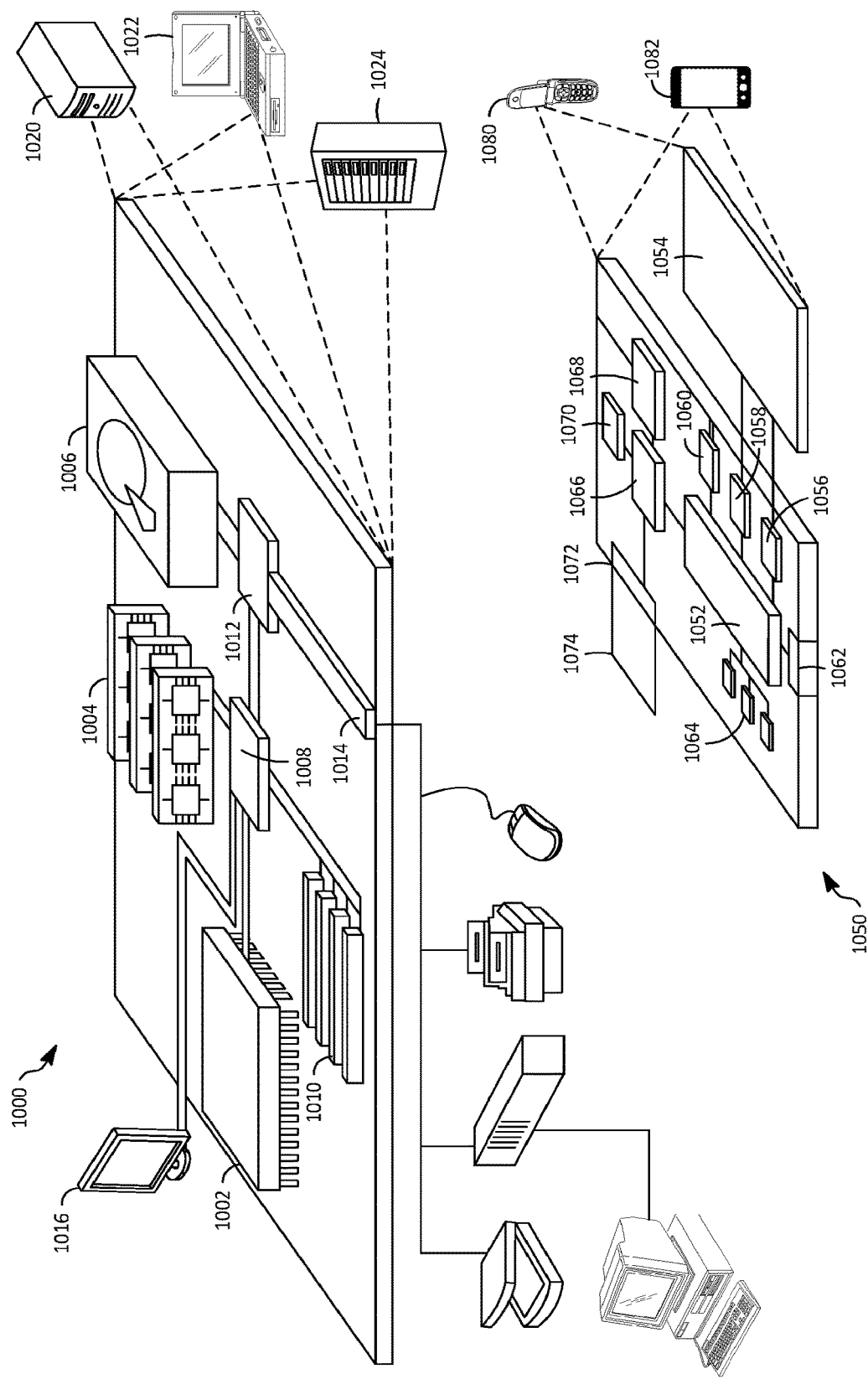
FIG. 10 is a diagram illustrating an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Therefore, other implementations are within the scope of any subsequently added claims.

What is claimed is:

1. A method for synchronized media playback, the method comprising:
   determining that a media playback device in a media playback group has been selected as a leader playback device from the media playback group based on leadership metrics from each media playback device in the media playback group, wherein a remaining media playback device in the media playback group has been designed as a follower playback device from the media playback group;
   receiving, from the follower playback device, a first series of synchronization requests;
   transmitting a first series of synchronization responses that are responsive to the first series of synchronization requests to the follower playback device, wherein a clock offset between the leader playback device and the follower playback device is based on the first series of synchronization requests and the first series of synchronization responses; and
   causing a media stream to be played back on the follower playback device in synchronization with the leader playback device based on the clock offset.

2. The method of claim 1, further comprising connecting to a communications network, wherein the media playback device is associated with the media playback group that includes a plurality of media playback devices.

3. The method of claim 1, further comprising receiving, from the follower playback device, a second series of synchronization requests, wherein a latency between two synchronization requests in the first series of synchronization requests is a first duration of time, wherein the latency between two synchronization requests in the second series of synchronization requests is a second duration of time, and wherein the second duration of time is shorter than the first duration of time.

4. The method of claim 3, further comprising:
   transmitting, to the follower playback device, a second series of synchronization responses that are responsive to the second series of synchronization requests;
   determining an updated clock offset based on at least a portion of the second series of synchronization responses; and
   transmitting the media stream for playback by the media playback group, wherein the media stream is played back on the follower playback device in synchronization with the leader playback device based on the updated clock offset.

5. The method of claim 4, wherein causing the media stream to be played back on the follower playback device in synchronization with the leader playback device based on the updated clock offset further comprises causing the media stream to be played back on the follower playback device in synchronization with the leader playback device based on the updated clock offset and an output delay of the follower playback device.

6. The method of claim 1, wherein the media playback device is selected as the leader playback device based on a comparison of a measure of quality of a data connection of one media playback device in the media playback group with the communications network and a measure of quality of a data connection of another media playback device in the media playback group with the communications network.

7. The method of claim 1, wherein the media playback device and the remaining media playback device each include a respective record indicating membership in the media playback group.

8. The method of claim 1, further comprising transmitting the media stream to the follower playback device in a sequence of timestamped data packets.

9. The method of claim 1, wherein the clock offset is determined based on a round-trip-time (RTT) between the leader playback device and the follower playback device.

10. A system for synchronized media playback, the system comprising:
    a hardware processor of a media playback device, wherein the hardware processor:
      determines that a media playback device in a media playback group has been selected as a leader playback device from the media playback group based on leadership metrics from each media playback device in the media playback group, wherein a remaining media playback device in the media playback group has been designed as a follower playback device from the media playback group;
      receives, from the follower playback device, a first series of synchronization requests;
      transmits a first series of synchronization responses that are responsive to the first series of synchronization requests to the follower playback device, wherein a clock offset between the leader playback device and the follower playback device is based on the first series of synchronization requests and the first series of synchronization responses; and
      causes a media stream to be played back on the follower playback device in synchronization with the leader playback device based on the clock offset.

11. The system of claim 10, wherein the hardware processor further connects to a communications network, wherein the media playback device is associated with the media playback group that includes a plurality of media playback devices.

12. The system of claim 10, wherein the hardware processor further receives, from the follower playback device, a second series of synchronization requests, wherein a latency between two synchronization requests in the first series of synchronization requests is a first duration of time, wherein the latency between two synchronization requests in the second series of synchronization requests is a second duration of time, and wherein the second duration of time is shorter than the first duration of time.

13. The system of claim 12, wherein the hardware processor further:
- transmits, to the follower playback device, a second series of synchronization responses that are responsive to the second series of synchronization requests;
- determines an updated clock offset based on at least a portion of the second series of synchronization responses; and
- transmits the media stream for playback by the media playback group, wherein the media stream is played back on the follower playback device in synchronization with the leader playback device based on the updated clock offset.

14. The system of claim 13, wherein causing the media stream to be played back on the follower playback device in synchronization with the leader playback device based on the updated clock offset further comprises causing the media stream to be played back on the follower playback device in synchronization with the leader playback device based on the updated clock offset and an output delay of the follower playback device.

15. The system of claim 10, wherein the media playback device is selected as the leader playback device based on a comparison of a measure of quality of a data connection of one media playback device in the media playback group with the communications network and a measure of quality of a data connection of another media playback device in the media playback group with the communications network.

16. The system of claim 10, wherein the media playback device and the remaining media playback device each include a respective record indicating membership in the media playback group.

17. The system of claim 10, further comprising transmitting the media stream to the follower playback device in a sequence of timestamped data packets.

18. The system of claim 10, wherein the clock offset is determined based on a round-trip-time (RTT) between the leader playback device and the follower playback device.

19. A non-transitory computer-readable medium comprising computer-executable instructions that, when executed by a processor, cause the processor to perform a method for synchronized media playback, the method comprising:
- determining that a media playback device in a media playback group has been selected as a leader playback device from the media playback group based on leadership metrics from each media playback device in the media playback group, wherein a remaining media playback device in the media playback group has been designed as a follower playback device from the media playback group;
- receiving, from the follower playback device, a first series of synchronization requests;
- transmitting a first series of synchronization responses that are responsive to the first series of synchronization requests to the follower playback device, wherein a clock offset between the leader playback device and the follower playback device is based on the first series of synchronization requests and the first series of synchronization responses; and
- causing a media stream to be played back on the follower playback device in synchronization with the leader playback device based on the clock offset.

* * * * *